(12) United States Patent  
Sasaki et al.

(10) Patent No.: US 8,041,207 B2  
(45) Date of Patent: Oct. 18, 2011

(54) PHOTOGRAPHING APPARATUS, PHOTOGRAPHING METHOD AND COMPUTER READABLE STORAGE MEDIUM STORING PROGRAM THEREIN

(75) Inventors: Masaaki Sasaki, Hachioji (JP); Kazuhisa Matsunaga, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/648,514

(22) Filed: Dec. 29, 2009

(65) Prior Publication Data

US 2010/0172641 A1 Jul. 8, 2010

(30) Foreign Application Priority Data

Jan. 8, 2009 (JP) ................................. 2009-002220

(51) Int. Cl.
*G03B 17/00* (2006.01)
(52) U.S. Cl. ...................................................... 396/265
(58) Field of Classification Search .................. 396/263, 396/265, 153
See application file for complete search history.

(56) References Cited

U.S. PATENT DOCUMENTS

| | | | | |
|---|---|---|---|---|
| 5,475,466 A * | 12/1995 | Iwasaki et al. | ................. | 396/153 |
| 5,877,804 A * | 3/1999 | Otsuki et al. | ................. | 348/155 |
| 5,930,532 A * | 7/1999 | Matsumoto | ..................... | 396/95 |
| 6,128,396 A * | 10/2000 | Hasegawa et al. | ............. | 382/103 |
| 7,023,469 B1 * | 4/2006 | Olson | ........................... | 348/152 |
| 7,218,759 B1 * | 5/2007 | Ho et al. | ........................ | 382/118 |
| 2006/0104625 A1 * | 5/2006 | Oya | .............................. | 396/153 |
| 2007/0086067 A1 * | 4/2007 | Suemoto et al. | .............. | 358/482 |
| 2007/0237514 A1 * | 10/2007 | Pillman et al. | ................ | 396/153 |
| 2007/0273771 A1 * | 11/2007 | Hayashi | ..................... | 348/222.1 |
| 2008/0088710 A1 * | 4/2008 | Iwamoto et al. | ........... | 348/220.1 |
| 2008/0309776 A1 * | 12/2008 | Suzuki | ....................... | 348/220.1 |
| 2008/0309793 A1 * | 12/2008 | Onoda et al. | ................ | 348/229.1 |
| 2010/0171810 A1 * | 7/2010 | Ohki | ................................ | 348/36 |
| 2011/0090368 A1 | 4/2011 | Iwamoto et al. | | |

FOREIGN PATENT DOCUMENTS

| | | |
|---|---|---|
| JP | 2002-218309 A | 8/2002 |
| JP | 2005-136754 A | 5/2005 |
| JP | 2006-005452 A | 1/2006 |
| KR | 2008-0034410 A | 4/2008 |

OTHER PUBLICATIONS

Korean Office Action dated Apr. 14, 2011 (and English translation thereof) in counterpart Korean Application No. 10-2009-0132914.

* cited by examiner

*Primary Examiner* — Clayton E Laballe
*Assistant Examiner* — Warren Fenwick
(74) *Attorney, Agent, or Firm* — Holtz, Holtz, Goodman & Chick, P.C.

(57) ABSTRACT

A photographing apparatus, including: a photographing section for generating photographed image data by performing a continuous shooting, and a controller for causing the photographing section to perform the continuous shooting with a continuous shooting speed thereof being slowed down in stages to correspond to a plurality of different continuous shooting speeds.

12 Claims, 16 Drawing Sheets

FIG. 3A

| C1=3 | | | | | | | | | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| TIME (t) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
| SERIAL SHOOT DURATION | ● | ● | ● | | | | | | | | | | | | | | ● | | | | | | | | | | | | | | | | | | | | | | | | | | | | | | | | | |
| fps=F1 | ● | ● | ● | | | | | | | | | | | | | | | | | | | | | | | | | | | | | | | | | | | | | | | | | | | | | | |
| fps=F2 | ● | ● | | | ● | | | | | | | | | | | | | | | | | | | | | | | | | | | | | | | | | | | | | | | | | | | | |
| fps=F3 | ● | | | | ● | ● | | | | | | | | | | | | | | | | | | | | | | | | | | | | | | | | | | | | | | | | | | | |
| fps=F4 | ● | | | | | | | | ● | | | | | | | | ● | | | | | | | | | | | | | | | | | | | | | | | | | | | | | | | | |

FIG. 3B

| C1=5 | | | | | | | | | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| TIME (t) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
| SERIAL SHOOT DURATION | ● | ● | ● | ● | ● | | | | | | | | | | | ● | | | | | | | | | ● | | | | | | | | ● | | | | | | | | | | | | | | | | |
| fps=F1 | ● | ● | ● | ● | ● | | | | | | | | | | | | | | | | | | | | | | | | | | | | | | | | | | | | | | | | | | | | |
| fps=F2 | ● | ● | ● | ● | | | ● | | | | | | ● | | | | ● | | | | | | | | ● | | | | | | | | | | | | | | | | | | | | | | | | |
| fps=F3 | ● | ● | ● | | | | ● | | ● | | | | | | | ● | | | ● | | | | | | | | | | | | | | ● | | | | | | | | | | | | | | | | |
| fps=F4 | ● | ● | | | ● | | | ● | ● | | | | | | | | ● | | | | | | | | ● | | | | | | | | ● | | | | | | | | | | | | | | | | |

FIG. 3C

| C1=7 | | | | | | | | | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| TIME (t) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
| SERIAL SHOOT DURATION | ● | ● | ● | ● | ● | ● | ● | | | | | | | | | ● | | | | | | | | | | | | | | | | | ● | | | | | | | ● | | | | | | | | | ● |
| fps=F1 | ● | ● | ● | ● | ● | ● | ● | | | | | | | | | | | | | | | | | | | | | | | | | | | | | | | | | | | | | | | | | | |
| fps=F2 | ● | ● | ● | ● | ● | ● | | ● | | | ● | | ● | | | | ● | | | ● | | | | | ● | | | | | | | | ● | | | | | | | | ● | | | | | | | | |
| fps=F3 | ● | ● | ● | ● | ● | | ● | | ● | ● | | | | | ● | ● | | | | ● | | | | ● | ● | | | | | | | | ● | | | | | | | | | ● | | | | | | | |
| fps=F4 | ● | ● | ● | ● | ● | | | ● | ● | | ● | | | | | | ● | | | ● | | | | ● | ● | | | | | | | | ● | | | | | | | ● | | | | | | | | | ● |

PHOTOGRAPHING APPARATUS, PHOTOGRAPHING METHOD AND COMPUTER READABLE STORAGE MEDIUM STORING PROGRAM THEREIN

BACKGROUND OF THE INVENTION

1. Field of the Invention

The present invention relates to a photographing apparatus, a photographing method and a computer readable storage medium storing a program therein.

2. Related Art

Heretofore, a photographing apparatus such as a digital camera or the like is known. The photographing apparatus has a continuous shooting function for continuously (serially) shooting a subject that moves (a moving subject) and generating a plurality of pieces of photographed image data of the subject.

Moreover, an image combining apparatus is known, wherein the image combining apparatus combines a plurality of pieces of image data generated by continuously shooting the moving subject by a photographing apparatus, and generates image data (moving subject continuous shoot combined image data) indicating a motion of the moving subject by a single image (see, for example, Japanese Patent Application Laid-Open Publication No. 2006-5452).

Moreover, in a field of a photographing apparatus having an interval photographing function for photographing images at a predetermined time interval to take movies for monitoring or the like, a photographing apparatus that automatically changes a setting of serial shoot duration to be shortened by determining that there is a change when a difference between photographed images (change of brightness, motion of the moving subject or the like) is larger than a set value (threshold value), is suggested (see, for example, Japanese Patent Application Laid-Open Publication No. 2002-218309).

However, in the traditional image combining apparatus, the motion of the moving subject, which enters the frame, moves around the frame and leaves from the frame, would have to be shot continuously within a restricted maximum burst for continuous shooting. For example, in a case of taking photographs of the moving subject that passes through the frame in one sec, with the maximum number of images to be shot being set to be twenty, the moving subject can be photographed until the moving subject leaves from the frame, if the continuous shooting starts just after the time when the moving subject enters the frame, and if a continuous shooting speed is set to be equal to or less than 20 fps (frame per second). However, if the moving subject is photographed by the photographing apparatus at a short serial shoot duration, that is the continuous shooting speed is set to be equal to or more than 20 fps, the continuous shooting finishes before the moving subject is out of the frame because of the maximum number of images to be shot.

Similarly, in a case of taking photographs of the moving subject that passes through the frame in two sec, serial shoot duration needs to be set so that a continuous shooting speed is set to be equal to or less than 10 fps, and in a case of taking photographs of the moving subject that passes through the frame in four sec, serial shoot duration needs to be set so that a continuous shooting speed is set to be equal to or less than 5 fps.

FIG. 15A shows an example of moving subject continuous shoot combined image in a case that the continuous shooting speed is set to be larger for a passing speed of the moving subject. FIG. 15B shows an example of moving subject continuous shoot combined image in a case that the continuous shooting speed is set to be smaller for a passing speed of the moving subject. As shown in FIG. 15A, if a photographing is performed at continuous shooting speed fps set to be larger for a passing speed of the moving subject, the moving subject continuous shoot combined image might be the one in which the moving subjects are gathered in a certain area in an angle of view.

Moreover, it cannot be said that an ideal moving subject continuous shoot combined image can be created by merely performing the continuous shooting while a movement of the moving subject from entering the frame to leaving from the frame. For example, if a moving subject passing through the frame in 0.5 sec is photographed at continuous shooting speed of 5 fps, the moving subject can be photographed throughout the frame. However, the number of frames each including the moving subject may be two or so. In this case, as shown in FIG. 15B, the moving subject continuous shoot combined image might be the one in which the number of the moving subject is smaller for the angle of view. The images as shown in FIGS. 15A and 15B are undesirable as the moving subject continuous shoot combined image.

FIG. 16 shows an ideal moving subject continuous shoot combined image. Generally, the ideal moving subject continuous shoot combined image should be considered as such an image that the moving subjects are evenly located in the combined image frame with the moving subjects not significantly being overlapped. The image as shown in FIG. 16 is the ideal moving subject continuous shoot combined image.

Here, a continuous shooting speed that is most preferable for obtaining the ideal moving subject continuous shoot combined image will be explained. Given that the photographing could be performed at such an ideal shutter timing that the first image is shot at the exact moment when the moving subject enters the frame, the maximum number of images to be shot is twenty and the number of frames to be used to be combined is five. In this case, for example, if the moving subject passes through the frame in a quarter sec, then the ideal moving subject continuous shoot combined image can be created most efficiently by continuously shooting five frames at a continuous shooting speed of 20 fps. Moreover, similar images can be created by continuously shooting ten frames at a continuous shooting speed of 40 fps and picking up every second frames from the shot ten frames. The images can also be said as the ideal images.

On the basis of the above, the relationship between a velocity of the moving subject and the continuous shooting speed (fps) for obtaining a moving subject continuous shoot combined image is shown in the next table 1.

TABLE 1

|  | 40 fps | 20 fps | 10 fps | 5 fps |
| --- | --- | --- | --- | --- |
| Moving subject passing through a single frame in ⅛ sec | 5 | - | - | - |
| Moving subject passing through a single frame in ¼ sec | 10 | 5 | - | - |
| Moving subject passing through a single frame in ½ sec | 20 | 10 | 5 | - |
| Moving subject passing through a single frame in 1 sec | -- | 20 | 10 | 5 |
| Moving subject passing through a single frame in 2 sec | -- | -- | 20 | 10 |
| Moving subject passing through a single frame in 4 sec | -- | -- | -- | 20 |

[-] impossible to shoot five frames
[--] over the maximum number of images to be shot As shown in table 1, a plurality of setting values of the fps capable of obtaining the ideal moving subject continuous shoot combined image exist corresponding to passing speeds of the moving subject. However, the ideal moving subject continuous shoot combined images cannot be obtained in the case that the photographing is performed at improper fps. Therefore, a user who photographs for obtaining the moving subject continuous shoot combined image has to predict and set proper value of continuous shooting speed (fps) considering the passing speed of the moving subject and an angle of view before the photographing so as to perform continuous shooting.

Moreover, even if a photographing apparatus is configured to speedup the continuous shooting speed when the moving subject enters the frame as described in Japanese Patent Application Laid-Open Publication No. 2002-218309, the continuous shooting speed at a time when the moving subject enters the frame is constant. Consequently, a continuous shooting speed at a time of combining images may possibly be not an appropriate value.

SUMMARY OF THE INVENTION

The present invention is directed to obtain photographed image data at a continuous shooting speed corresponding to a moving subject, which moves at a variety of speeds.

According to a first aspect of the present invention, there is provided a photographing apparatus, including: a photographing section for generating photographed image data by performing a continuous shooting, and a controller for causing the photographing section to perform the continuous shooting with a continuous shooting speed thereof being slowed down in stages to correspond to a plurality of different continuous shooting speeds.

According to a second aspect of the present invention, there is provided a photographing method of a photographing apparatus for performing a continuous shooting to generate photographed image data, including the steps of: starting the continuous shooting at a predetermined continuous shooting speed, and performing the continuous shooting with the continuous shooting speed being slowed down in stages to correspond to a plurality of different continuous shooting speeds.

According to a third aspect of the present invention, there is provided a computer readable storage medium storing a program to be executed by a computer for controlling a photographing apparatus, wherein the photographing apparatus includes a function to perform a continuous shooting to generate photographed image data, and the program causes the computer to execute a function to perform the continuous shooting with a continuous shooting speed thereof being slowed down in stages to correspond to a plurality of different continuous shooting speeds.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3A is a diagram showing a table of an image selection pattern with a maximum burst C1 for continuous shooting is equal to three;

FIG. 3B is a diagram showing a table of an image selection pattern with a maximum burst C1 for continuous shooting is equal to five;

FIG. 3C is a diagram showing a table of an image selection pattern with a maximum burst C1 for continuous shooting is equal to seven;

DETAILED DESCRIPTION OF THE PREFERRED EMBODIMENTS

In the following, a photographing apparatus, a photographing method and a computer readable storage medium storing a program therein according to an embodiment of the present invention will be described with reference to the attached drawings. Although, technically preferable various limitations for implementing the present invention are put on the embodiment described below, the scope of the present invention is not limited to the following embodiment and the shown examples.

The embodiment of the present invention will be described with reference to FIGS. 1 to 11. First, a configuration of a photographing apparatus 1 according to the embodiment will be described with reference to FIG. 1.

Hereinafter, a target to be photographed by the photographing apparatus 1 will be called as a subject. In particular, the subject that moves will be called as a moving subject. Moreover, photographic data continuously shot will be called as a frame, the number of frames to be photographed in one sec will be called as fps (frame per second) as a continuous shooting speed, and a photographing area included in the frame will be called as an angle of view. Moreover, combining moving subject area images obtained from a plurality of frames in which the moving subject moves around within the angle of view will be called as a moving subject continuous shoot combination (or simply called as a combination) and an image indicating a motion of the moving subject (moving condition) and is generated by the moving subject continuous shoot combination will be called as a moving subject continuous shoot combined image.

The photographing apparatus 1 is a photographing apparatus such as a digital camera or the like, and the photographing apparatus 1 includes a continuous shooting function (serial shooting function) for continuously shooting a plurality of images. Moreover, the photographing apparatus 1 includes an image combining function for combining images that are continuously shot and for generating the moving subject continuous shoot combined image.

Figure 1:
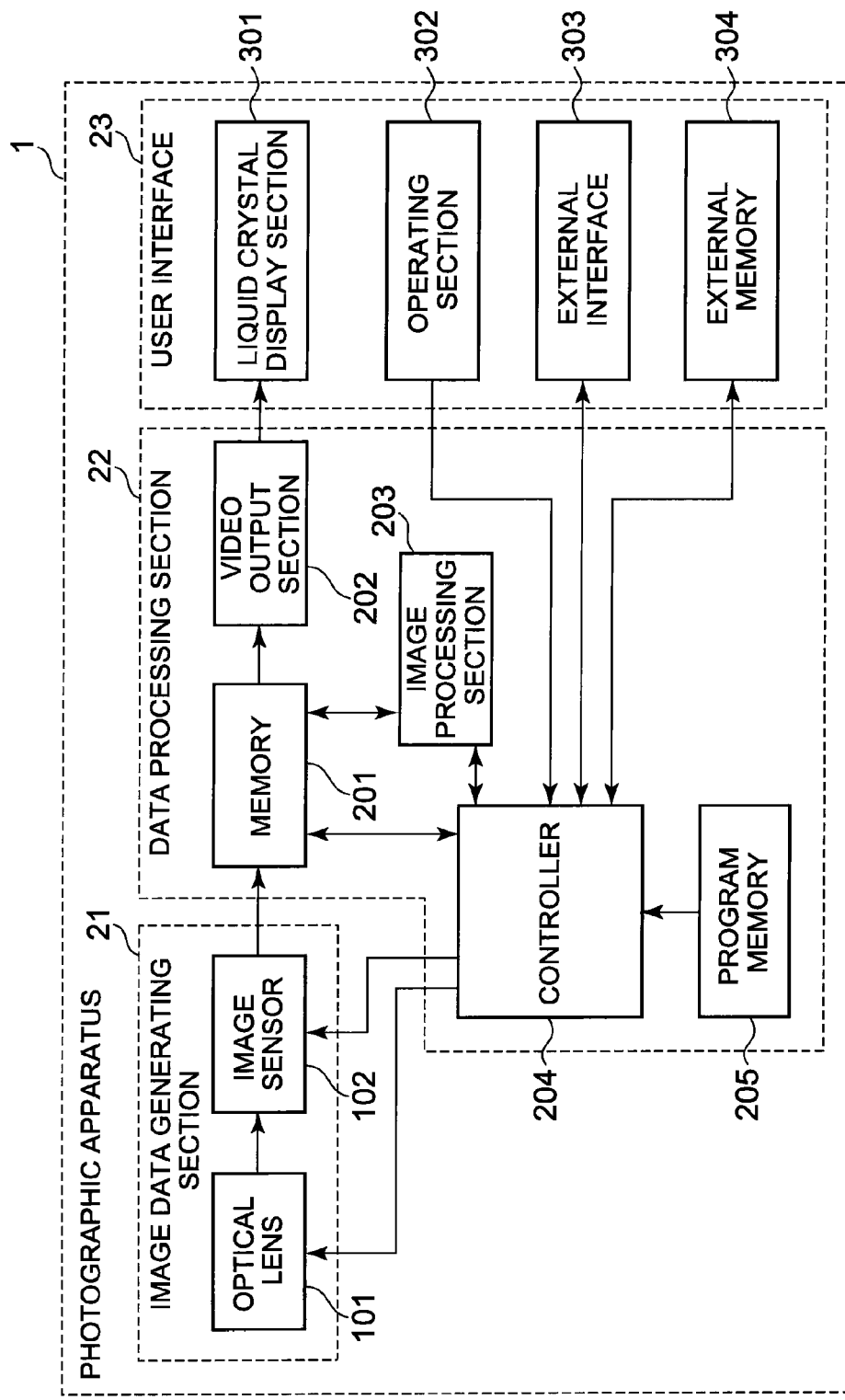
FIG. 1 is a block diagram showing a functional configuration of a photographing apparatus according to an embodiment of the present invention.

As shown in FIG. 1, the photographing apparatus 1 includes an image data generating section 21 for photographing the subject, a data processing section 22 for performing an image processing, and a user interface 23 for displaying processing results to a user and accepting an operation by the user.

The image data generating section 21 includes an optical lens 101 and an image sensor 102.

The optical lens 101 is composed of lens that concentrates lights to photograph the subject, and has a peripheral circuit for adjusting camera setting parameters such as focus, an exposure and the like. The image sensor 102 captures an image formed by concentrating the lights by the optical lens 101 and composed of a Charge Coupled Device (CCD) and the like.

Incidentally, the image data generating section 21 is capable of performing a high resolution image photographing and a low resolution image photographing (a live view photographing). The low resolution image photographing is such that, for example, an image resolution thereof is XGA (1024× 768 dots) or so, thus the resolution is low. However, a movie shooting and reading out the image can be performed at a speed of 30 fps (frame per second). On the other hand, the high resolution image photographing is such that, for example, if a maximum number of pixels of the photographing apparatus 1 is 4,000,000, then the photographing apparatus 1 performs an image photographing at 4 million pixels. However, an image reading in the high resolution image photographing is slow.

The data processing section 22 includes a memory 201, a video output section 202, an image processing section 203, a controller 204, and a program memory 205.

The memory 201 is composed of a random access memory (RAM), and is provided for temporarily storing image data retrieved by the image sensor 102 at every photographing moment. The memory 201 also stores image data needed for an image processing, values of each of various flags, threshold values or the like. Moreover, a memory region for storing and reading display image data for displaying an image is included in the memory 201.

The video output section 202 is a section for generating an RGB signal from the image data. The video output section 202 readouts display image data stored in the memory region of the memory 201, generates the RGB signal, and outputs the generated RGB signal to a liquid crystal display section 301 of the user interface 23. Moreover, the video output section 202 can also output the RGB signal to an external apparatus such as a TV, a personal computer (PC), a projector or the like through the external interface 303, so that the RGB signal is displayed on the external apparatus.

To the image data that is temporarily stored in the memory 201, the image processing section 203 performs a predetermined image processing for displaying the image. The image data, to which the image processing is performed, is stored in the memory region in the memory 201 as display image data. Moreover, the image processing section 203 has a function for compressing and encoding the image data to a file in the form of Joint Photographic Expert Group (JPEG) or the like and a function, to the contrary, for decompressing and decoding the compressed and encoded image data. For example, the image data stored in the memory 201 is readout by the image processing section 203, compressed and encoded in the form of JPEG, and stored in an external memory 304. Moreover, a JPEG file of an image stored in the external memory 304 is readout by the image processing section 203, decompressed and decoded, and stored in the memory 201 as the image data.

The controller 204 includes a Central Processing Unit (CPU), a RAM (not shown) and the like and controls each part of the photographing apparatus. In the controller 204, the CPU readouts a designated program from programs stored in the program memory 205, stores the read designated program in the RAM and executes various processing cooperating with the program expanded in the RAM.

The program memory 205 is composed of a memory device such as a Read Only Memory (ROM), a flash memory and the like and stores various programs or data needed for a behavior of the controller 204. In particular, the program memory 205 stores a setting program and a first continuous shooting combining program as described hereinafter.

The user interface 23 includes the liquid crystal display section 301, an operating section 302, the external interface 303, and the external memory 304.

The liquid crystal display section 301 displays photographed images on the basis of the RGB signal output from the video output section 202. To put it concretely, the liquid crystal display section 301 displays live view images based on a plurality of pieces of image data (image frames) that are generated by the image data generating section 21, displays moving images that are stored in the external memory 304 during the taping, or reproduces and displays the moving images stored in the external memory 304. The liquid crystal display section 301 may include video memory (not shown) for temporarily storing display image data, which arbitrarily output from the video output section 202. Alternatively, the liquid crystal display section 301 may be a display section such as an ElectroLuminescent Display (ELD) or the like.

The operating section 302 includes a plurality of keys such as various function keys, a selection key, a menu key, a shutter key, a power key or the like, and receives key operation to the keys by the user to output an operation signal, which corresponds to the key operation, to the controller 204.

The external interface 303 is a connection terminal between the photographing apparatus 1 and the external apparatus such as a TV, a personal computer (PC), a projector or the like, and the external interface 303 transmits and receives data through a predetermined communication cable. The external memory 304 includes, for example, a nonvolatile memory such as a Secure Digital (SD) card, a Memory Stick™ or the like, and a hard disk or the like. The external memory 304 stores a plurality of pieces of image data corresponding to the subject image photographed by the image data generating section 21. The external memory 304 stores, for example, image data converted into a JPEG file.

Figure 2:
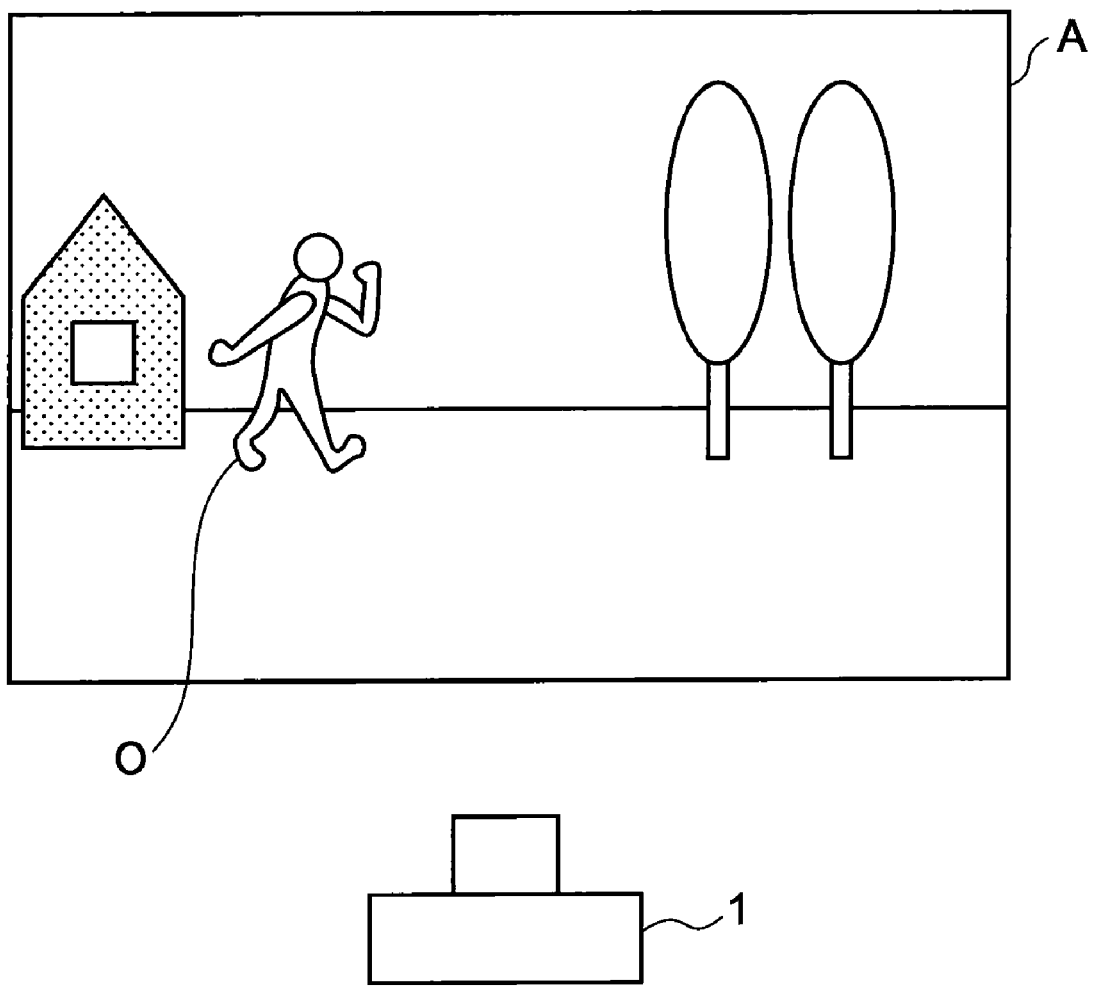
FIG. 2 is a diagram showing a condition of the photographing apparatus photographing a moving subject.
Figure 4:
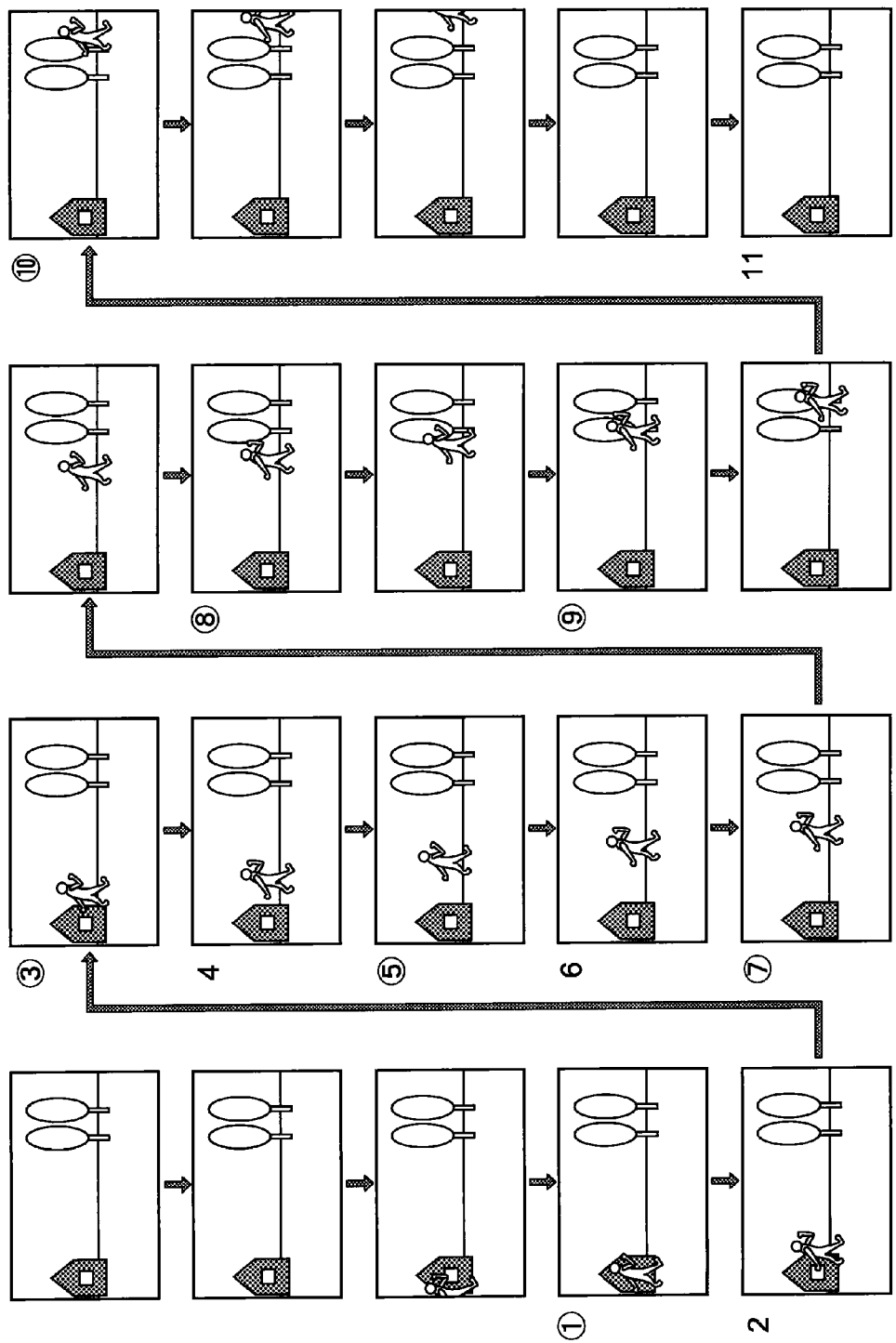
FIG. 4 is a diagram showing a condition of a motion of the moving subject.
Figure 5:
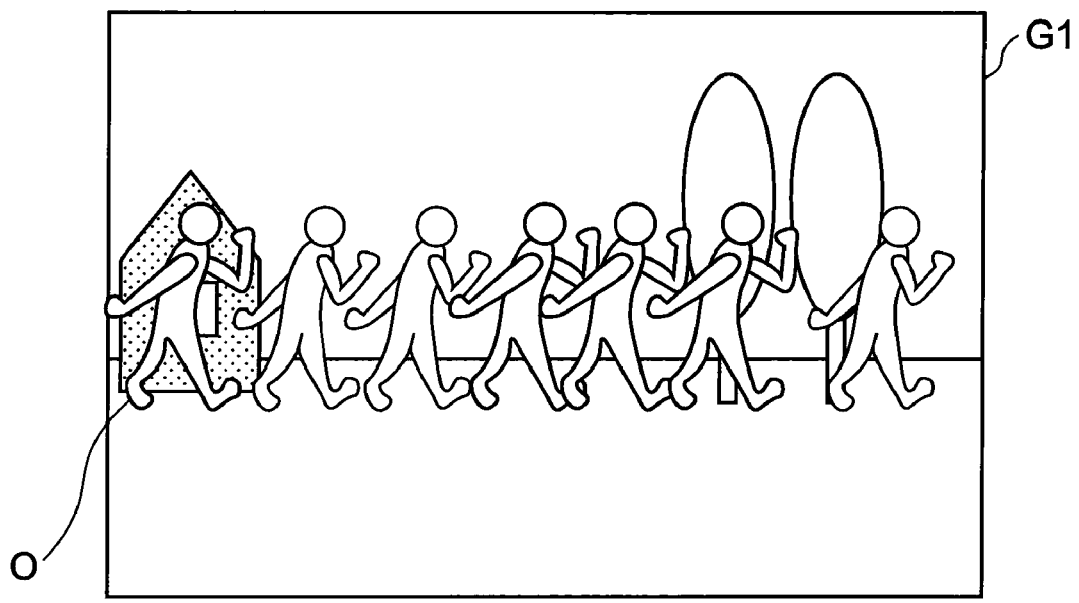
FIG. 5 is a diagram showing moving subject continuous shoot combined image of the moving subject.

Next, a behavior of the photographing apparatus 1 will be described with reference to FIGS. 2 to 11. Firstly, an outline of continuous shooting and moving subject continuous shooting and combining according to the embodiment will be explained. FIG. 2 shows a condition of the photographing apparatus photographing a moving subject O. FIG. 3A shows a table of an image selection pattern with a maximum burst C1 for continuous shooting is equal to three. FIG. 3B shows a table of an image selection pattern with a maximum burst C1 for continuous shooting is equal to five. FIG. 3C shows a table of an image selection pattern with a maximum burst C1 for continuous shooting is equal to seven. FIG. 4 shows a condition of a motion of the moving subject O. FIG. 5 shows a moving subject continuous shoot combined image G1 of the moving subject O.

As shown in FIG. 2, a case of continuously shooting a moving human as the moving subject O by the photographing apparatus 1 will be explained as an example of the continuous shooting according to the embodiment. The photographing apparatus 1 will be kept to be a fixed state by a tripod stand, a grip by a photographer or the like during a shooting. As a result, only the moving subject O moves in an angle of view A.

The shooting in this embodiment is a shooting model of N>C, wherein N represents maximum number of images to be shot and C represents effectual number of moving subjects in the moving subject continuous shoot combined images. Suppose that a first frame in the continuous shooting starts to be shot at a moment when the moving subject O enters the frame, the continuous shooting in this embodiment is performed with the continuous shooting speed slowed down (spacing serial shoot duration) in stages, though the continuous shooting in the usual case is repeated up to a maximum number of images to be shot at a predetermined continuous shooting speed.

Let a continuous shooting speed F1 be a default value of a continuous shooting speed (fps). In the photographing apparatus 1, at the beginning, the continuous shooting is performed at the continuous shooting speed F1 until the number of continuously shot frames becomes C1, wherein the number C1 is set to be an odd that satisfies a relation of N>C1≧C.

Although there is no problem with the number C1 to be C1=C if the moving subject moves ideally such that a first image can be shot at the moment when the moving subject enters the frame and leaves from the frame at the moment when the shooting of C-th frame has finished, it is difficult to shoot under the ideal condition in fact. Therefore, the number C1 should preferably be set on the safe side.

Preferably, the maximum number N of images to be shot may be a number sufficiently larger than the number C1 of continuous shooting, because an availability to change the continuous shooting speed in stages grows wider, that is, a speed range of the moving subject capable of being shot by the photographing apparatus grows wider.

After C1 frames are continuously shot, the continuous shooting speed F1 is changed to F2=F1/2 and continuous shooting by C2=(C1−C)/2 frames is performed at the photographing apparatus 1. Then, after C2 frames are continuously shot at the continuous shooting speed of F2, the continuous shooting speed F2 is changed to F3=F2/2 and continuous shooting by C3=C2 frames is performed at the photographing apparatus 1. In a same manner, the continuous shooting process at the photographing apparatus 1 is repeated with the continuous shooting speed being reduced to be halved until the total number of continuously shot frames CA (CA=C1+C2+C3+ . . . ) exceeds the maximum number N, or until the continuous shooting speed becomes sufficiently small value.

Each of the frames shot by the aforementioned manner is designated as follows, in an order from the first frame.

f1, f2, . . . , f(C1),
f(C1+1), f(C1+2), . . . , f(C1+C2),
f(C1+C2+1), . . . , f(CA).

Here, concrete examples in cases that the number C1 of continuous shooting is C1=3, 5 or 7 will be discussed. For example, if the number C1=3, (continuous shooting speed, the number of images to be shot) is designated as follows.

(F1, 3): default value (F1, C1)
(F2, 1): F2=F1/2, C2=(C1−1)/2=1
(F3, 1): F3=F2/2, C3=C2=1
(F4, 1): F4=F3/2, C4=C3=1
. . .

An example of a shooting pattern in the case of C1=3 will be shown in FIG. 3A. Signs "●" in "serial shoot duration" indicate images to be actually shot at each time in the photographing apparatus 1. That is, the photographing images to be actually shot (total images to be photographed) is shot with the continuous shooting speed being slowed down in stages such that the first three images are shot at a time interval of one sec (continuous shooing speed (fps)=F1), a next one image is shot after a time interval of two sec (continuous shooting speed (fps)=F2), a next one image is shot after a time interval of four sec (continuous shooting speed (fps)=F3), and a next one image is shot after a time interval of eight sec (continuous shooting speed (fps)=f4).

For example, if C1=5, (continuous shooting speed, the number of images to be shot) is designated as follows.

(F1, 5): default value (F1, C1)
(F2, 2): F2=F1/2, C2=(C1−1)/2=2
(F3, 2): F3=F2/2, C3=C2=2
(F4, 2): F4=F3/2, C4=C3=2
. . .

An example of a shooting pattern in the case of C1=5 will be shown in FIG. 3B.

For example, if the number C1=7, (continuous shooting speed, the number of images to be shot) is designated as follows.

(F1, 7): default value (F1, C1)
(F2, 3): F2=F1/2, C2=(C1−1)/2=3
(F3, 3): F3=F2/2, C3=C2=3
(F4, 3): F4=F3/2, C4=C3=3
. . .

An example of a shooting pattern in the case of C1=7 will be shown in FIG. 3C.

In the case of C1=5 as shown in FIG. 3B, photographed frames are designated as follows.

f1=$f_{t=1}$, f2=$f_{t=2}$, f3=$f_{t=3}$, f4=$f_{t=4}$, f5=$f_{t=5}$, f6=$f_{t=7}$, f7=$f_{t=9}$, f8=$f_{t=13}$, f9=$f_{t=17}$, f10=$f_{t=25}$, f11=$f_{t=33}$

Here, if the frames continuously shot in the case that the continuous shooting speed is equal to F2 are designated as f21, f22, . . . , f2N, then, the following relations are approved.

$$f21=f1,$$

$$f22=f3,$$

$$f23=f5,$$

. . .

$$f2(C1-1)=f(C1+C2-1),$$

$$f2(C1)=f(C1+C2)$$

Similarly, if the frames continuously shot in the case that the continuous shooting speed is equal to F3 are designated as f31, f32, . . . , f3N, then, the following relations are approved.

$$f31=f1,$$

$$f32=f5,$$

$$\ldots$$

$$f3(C1)=f(C1+C2+C3)$$

In a similar manner, all of the C1 frames that are continuously photographed at a continuous shooting speed of default value times two to the minus n-th power can be applied to the photographed images. As described above, all of the frames needed in each continuous shooting speed can be photographed in the case that the number C1 for continuous shooting is an odd number.

As shown in FIG. 4, in the case that the moving subject O moves will be described. The time interval between each frame is set to be one sec, the maximum number N of images to be shot is eleven (N=11), and the continuous shooting number C1 is seven (C1=7). When the shooting is started from the fourth frame, in which the moving subject O enters the angle of view, the shooting is performed by the shooting pattern of signs "●" in "serial shoot duration" in FIG. 3C. In this manner, pieces of photographed image data (frames) to which numbers from 1 to 11 are assigned in FIG. 4 is generated. Then, frames such as the moving subject O in each of which does not significantly overlap with each other are selected, a subject area image of the moving subject O and a background area image are separated in each of the selected frames, and the plurality of separated subject area images are combined into one of the separated background image.

In this embodiment, photographed frames including photographed tenth frame, in which the moving subject O is just before leaving out from the frame, are assumed to be selected among the photographed eleven frames. The continuous shooting speed (fps) of the photographed tenth frame is F2. Therefore, such frames that are based on the "●" pattern of continuous shooting speed (fps)=F2 in FIG. 3C are selected. That is, seven photographed frames including the first, third, fifth, seventh, eighth, ninth and tenth frame are selected. Then, when the selected seven frames are combined, a moving subject continuous shoot combined image G1 shown in FIG. 5 can be obtained.

The combined image G1 includes seven subject areas of the moving subject O. In the combined image G1, the seven subject areas are distributed from a point where the moving subject O enters the angle of view A to a point where the moving subject O is just before leaving from the angle of view A.

As described above, in this embodiment, if the moving subject O moves at a constant speed, frames that are needed for the moving subject continuous shooting combination, wherein each of the moving subject in each frame moderately dispersed, can be continuously shot regardless of the moving speed of the moving subject and the angle of view (size of the frame). However, this embodiment is not limited to the case where the moving subject O moves at a constant speed.

Incidentally, in the case that the number C1 for continuous shooting is an even number, not all of the frames needed for the combination can be photographed at each continuous shooting speed. If you want to combine even numbers of the frames, then let the photographed images be combined by selecting the photographed images the moving subject in each of which are adequately distributed, judging from condition within each of the frames, after continuously shooting C1 frames where the number C1 has been made to be an odd number by adding "+1".

Figure 6:
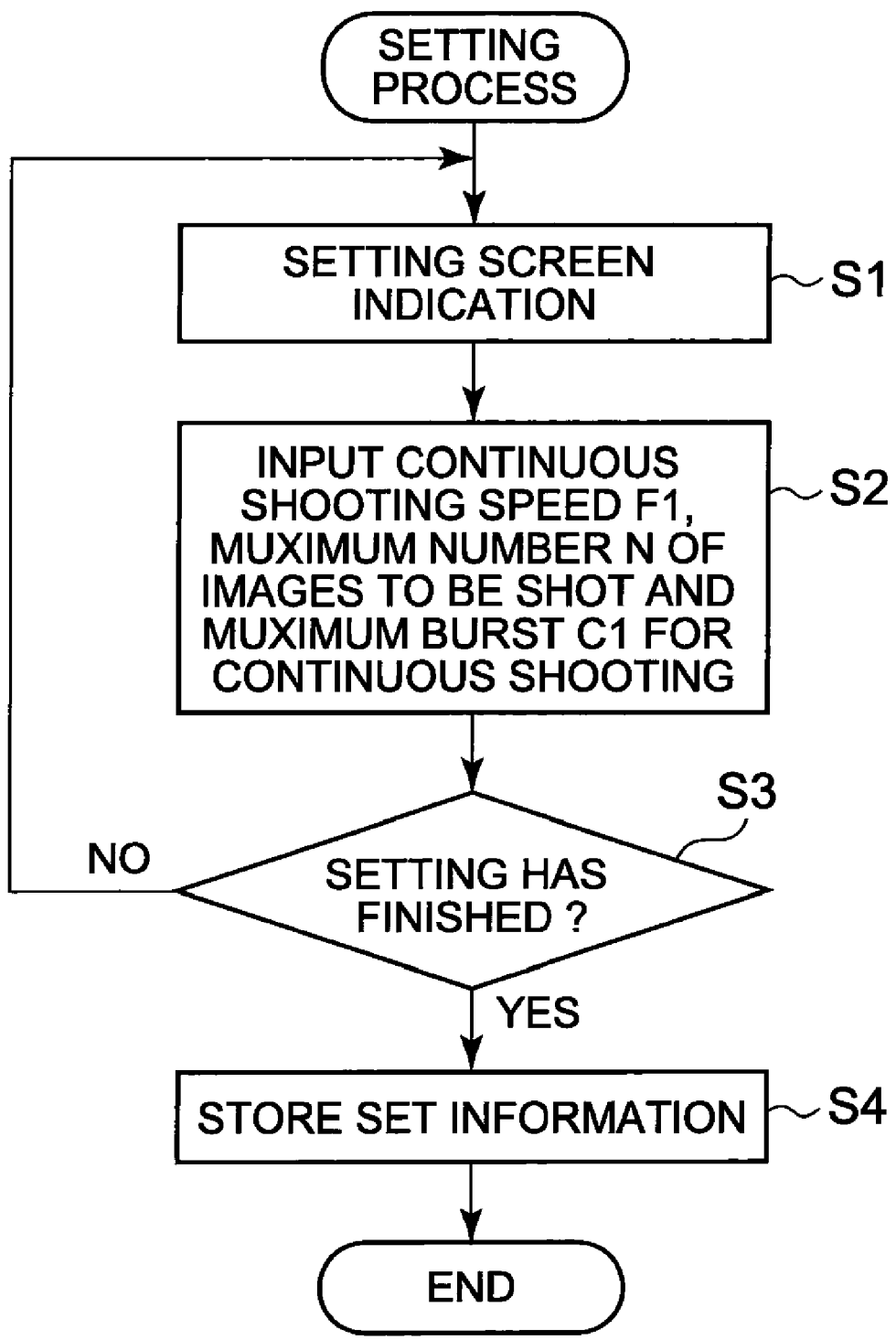
FIG. 6 is a flow-chart showing a setting process according to the embodiment of the present invention.
Figure 7:
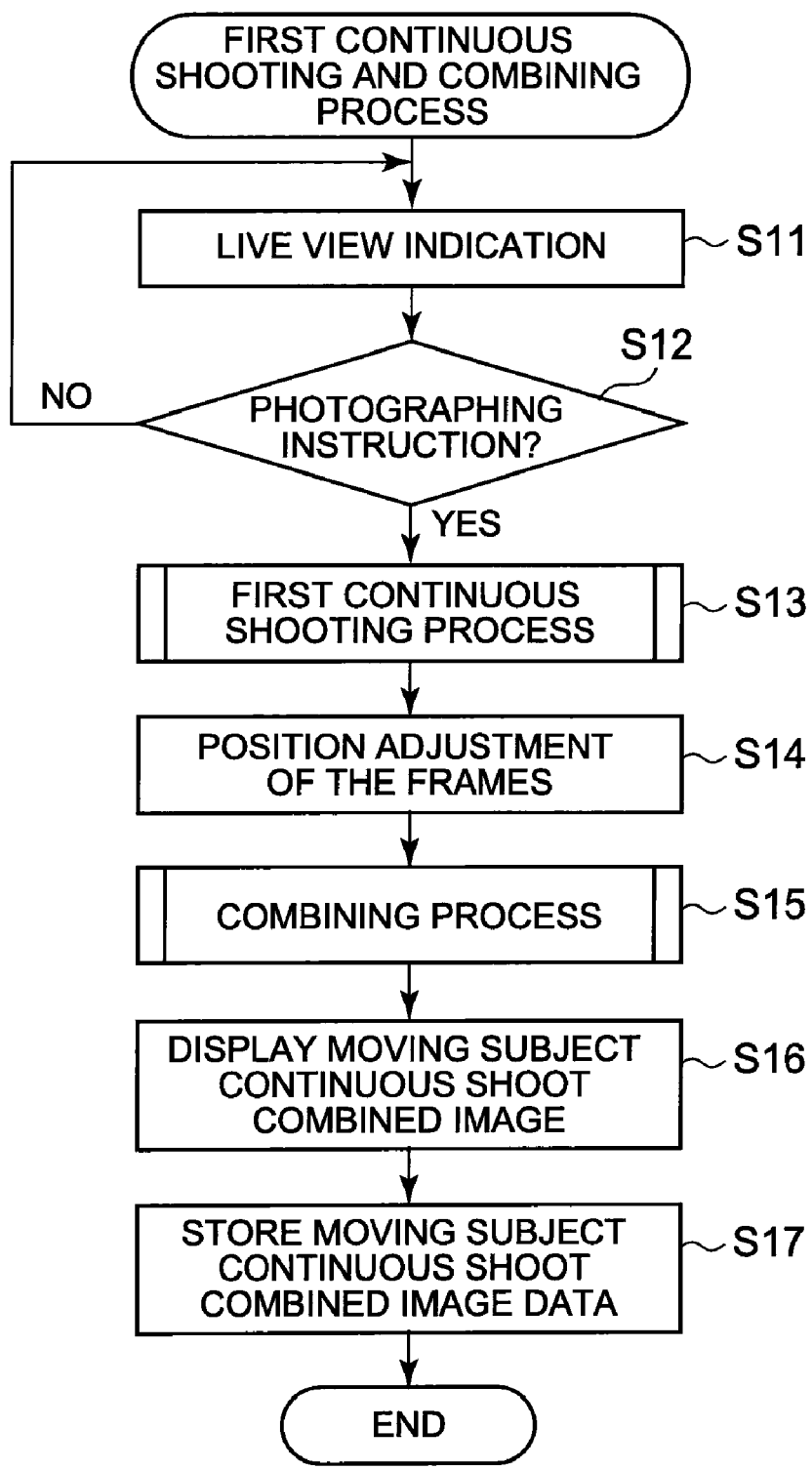
FIG. 7 is a flow-chart showing a first continuous shooting and combining process according to the embodiment of the present invention.
Figure 8:
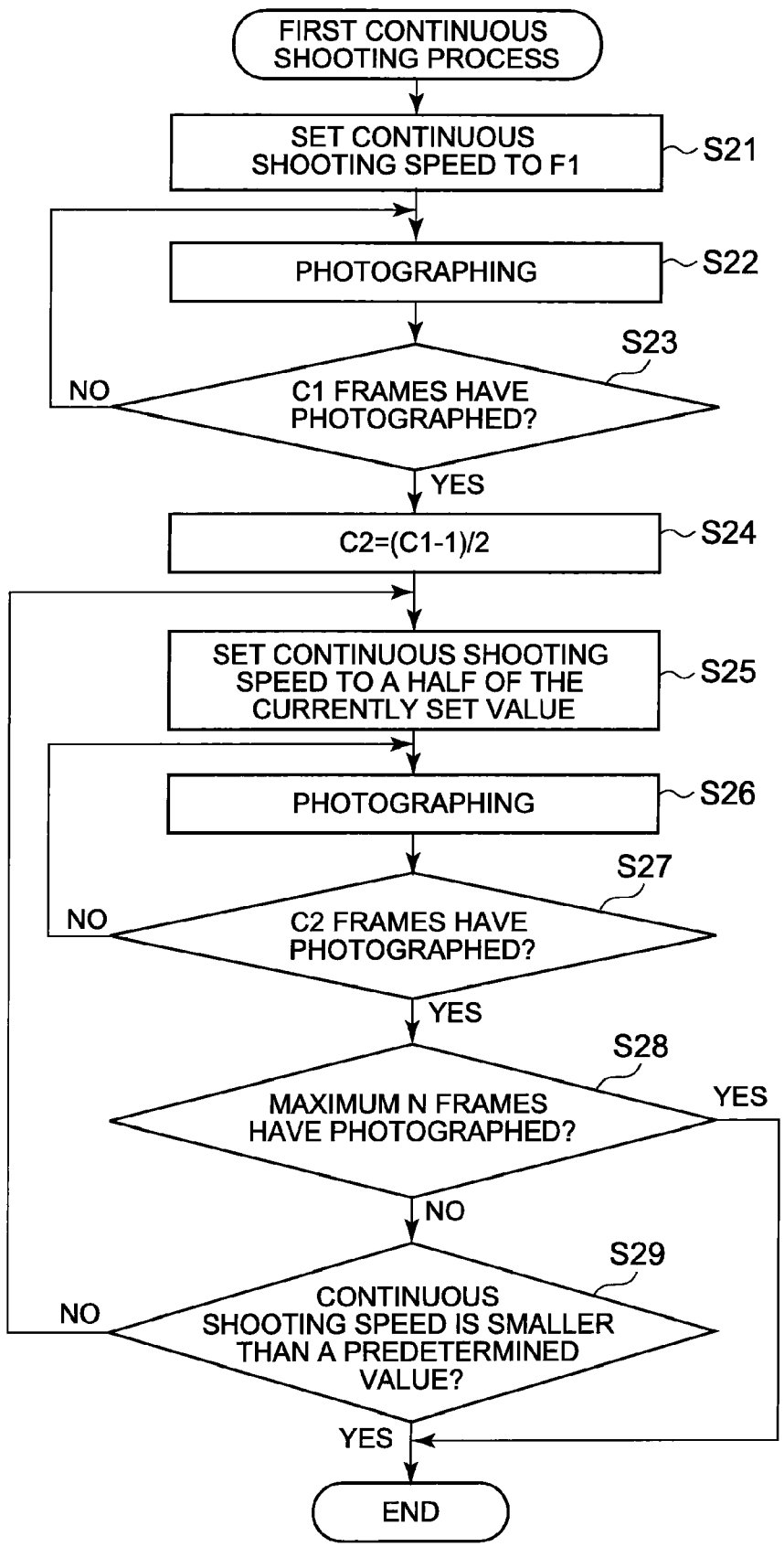
FIG. 8 is a flow-chart showing a first continuous shooting process in the first continuous shooting and combining process.
Figure 9:
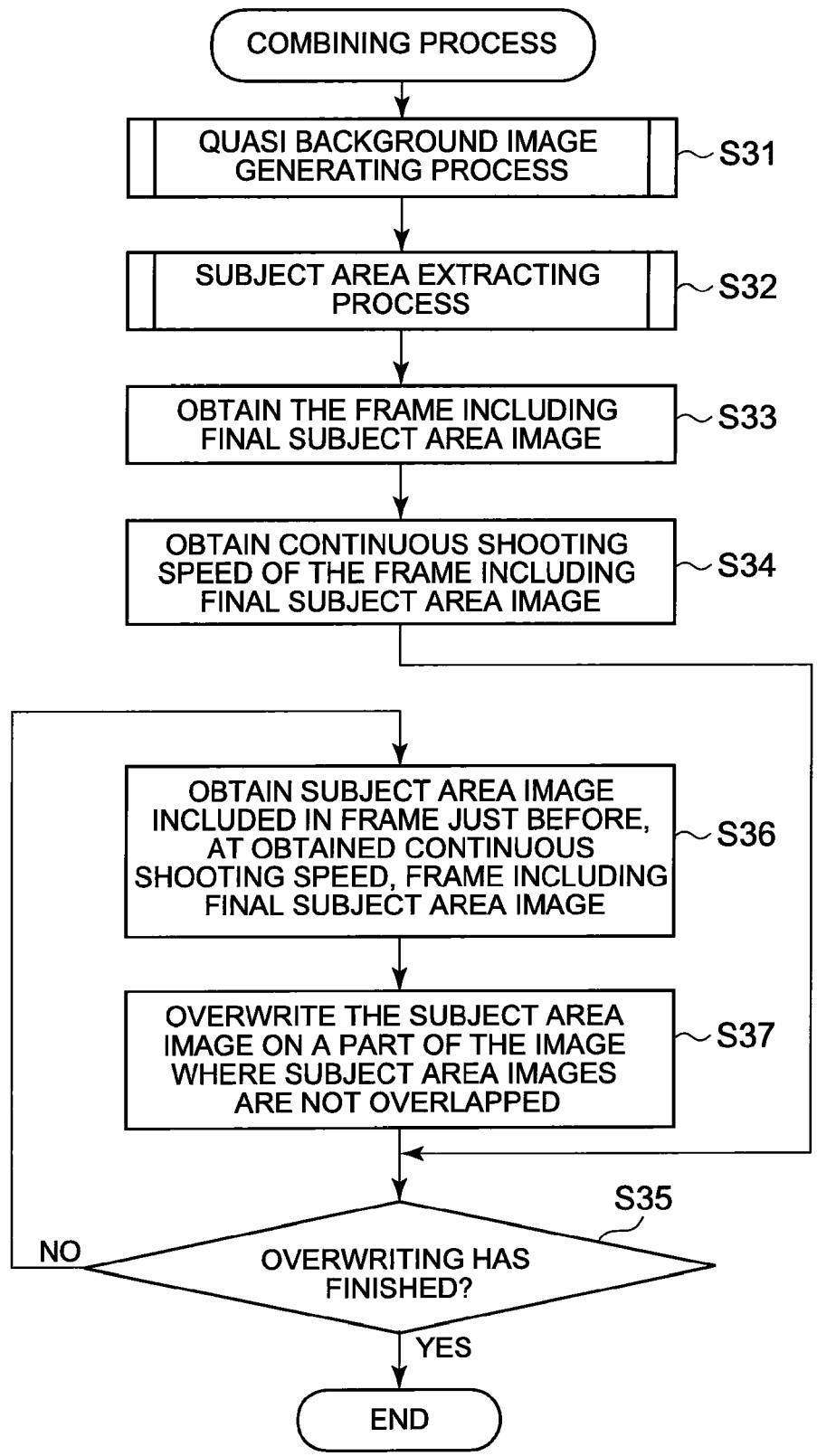
FIG. 9 is a flow-chart showing a combining process in the first continuous shooting and combining process.
Figure 10:
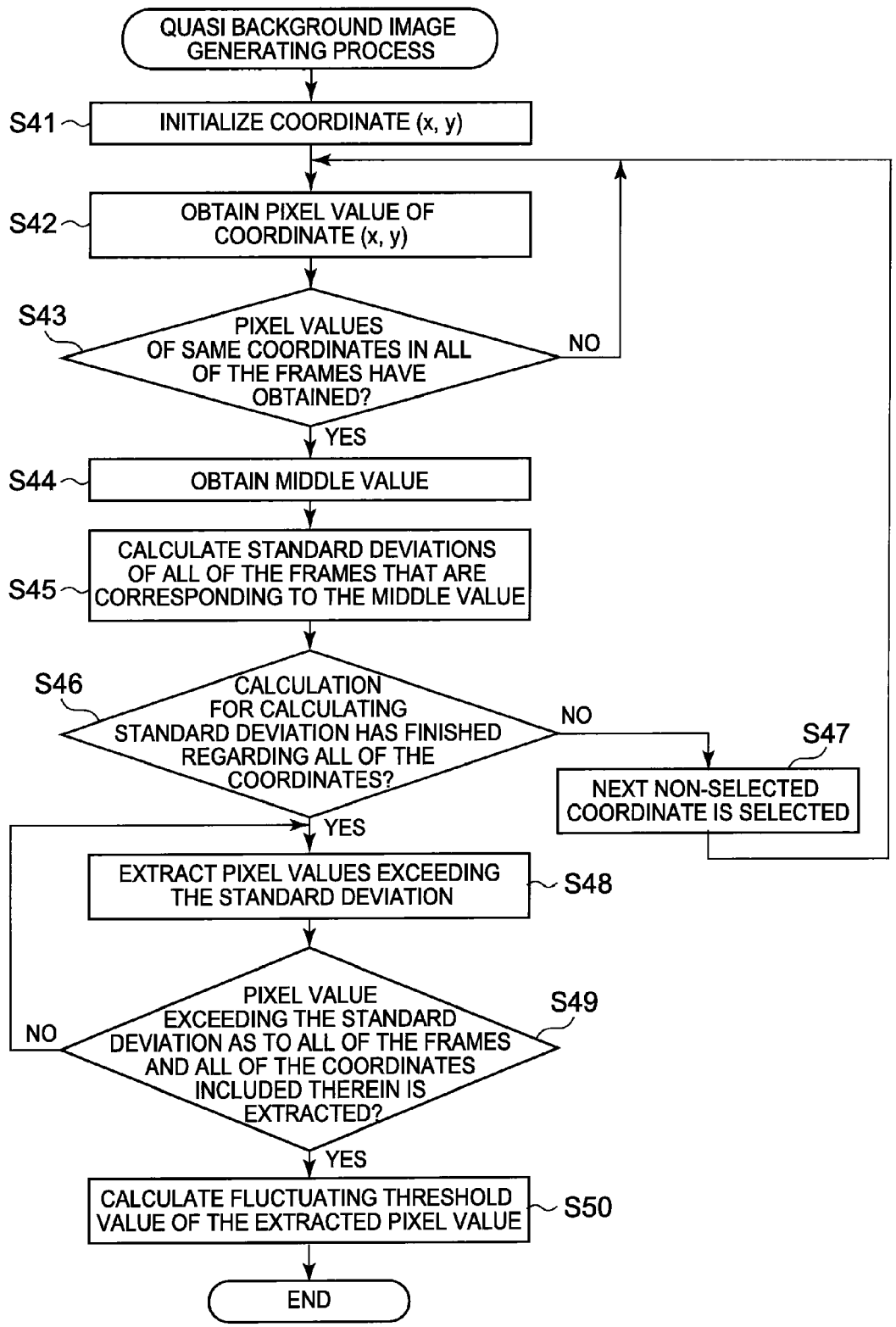
FIG. 10 is a flow-chart showing a quasi background image generating process in the combining process.
Figure 11:
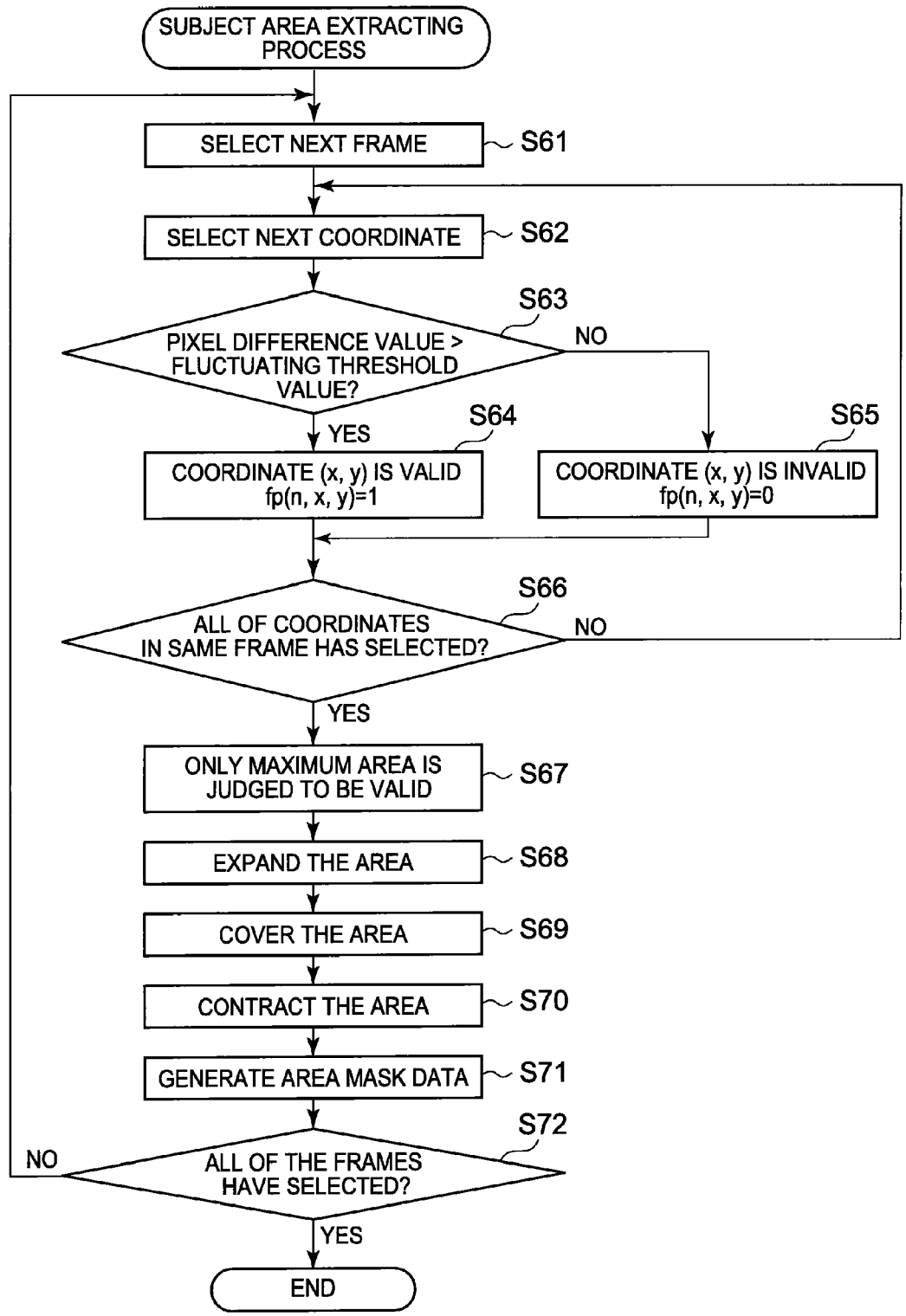
FIG. 11 is a flow-chart showing a subject area extraction process in the first continuous shooting and combining process.

Next, a setting process and a first continuous shooting and combining process each executed at the photographing apparatus 1 will be explained with reference to FIGS. 6 to 11. FIG. 6 shows a flow of the setting process. FIG. 7 shows a flow of the first continuous shooting and combining process. FIG. 8 shows a flow of a first continuous shooting process in the first continuous shooting and combining process. FIG. 9 shows a combining process in the first continuous shooting and combining process. FIG. 10 shows a flow of a quasi background image generating process in the combining process. FIG. 11 shows a flow of a second continuous shooting and combining process.

Firstly, the setting process will be explained with reference to FIG. 6. The setting process is a process where parameters that are needed for the continuous shooting such as a continuous shooting speed F1 as a default value of the continuous shooting speed (continuous shooting speed at a time of starting the shooting), the maximum number N of images to be shot and a maximum burst C1 for continuous shooting.

In the photographing apparatus 1, for example, during the live view displaying is being performed, the controller 204 executes the setting process according to the setting program stored in the program memory 205 when an execution instruction as a trigger of the setting process is input to the operating section 302 by a user.

As shown in FIG. 6, a setting screen for setting the continuous shooting speed F1, the maximum number N of images to be shot and the maximum burst C1 for continuous shooting is, firstly, displayed on the liquid crystal display section 301 (step S1). Then, an operation by the user for inputting the continuous shooting speed F1, the maximum number N of images to be shot and the maximum burst C1 for continuous shooting is accepted through the operating section 302 (step S2).

Then, whether the setting process is to be finished or not is judged corresponding to an existence of an input of a setting process termination indication by the user through the operating section 302 (step S3). If the setting process is not to be finished (step S3; No), then the process is shifted to step S1.

If the setting process is to be finished (step S3; Yes), the continuous shooting speed F1, the maximum number N of images to be shot and the maximum burst C1 for continuous shooting, each of which having been input at step S2, are stored into the memory 201 (step S4), and the setting process is finished. Here, various conditions needed for the photographing such as an exposure time or the like are assumed to be arbitrarily set according to an operation setting input or the like through the operation section 301, aside from the above setting process, during the live view displaying is being performed.

Next, the first continuous shooting and combining process will be explained with reference to FIGS. 7 to 11. The first continuous shooting and combining process is a process for continuously shooting the moving subject with the continuous shooting speed slowed down in stages from the default value F1, selecting the photographed image data of C1 frames including the subject area image from all of the photographed image data at an adequate continuous shooting speed, and generating the moving subject continuous shoot combined image by combining the selected photographed image data. The photographing apparatus 1 is assumed to be fixed during the continuous shooting.

In the photographing apparatus 1, for example, while the live view displaying is being performed, the controller 204 executes the first continuous shooting and combining process according to the first continuous shooting combining program stored in the program memory 205 when an execution instruction as a trigger of the first continuous shooting and combining process is input to the operating section 302 by the user.

As shown in FIG. 7, live view image data generated by the image data generating section 21 is, firstly, displayed by the video output section 202 on the liquid crystal display section 301 as a live view image (step S11). Then, whether an operation by the user for holding down the shutter key of the operating section 302 is input or not, that is whether an instruction for photographing is input or not is judged (step S12). Then, the first continuous shooting process for continuously shooting the moving subject is executed with the continuous shooting speed slowed down in stages from the default value F1 (step S13). The first continuous shooting process at step S13 will be described in detail hereinafter.

For all of the photographed frames (total photographed image data), position offsets are corrected so that feature points in each of the images corresponding to the photographed frames coincident (step S14).

Then, the combining process for combining photographed image data of C1 frames that are selected at an adequate continuous shooting speed and for generating the moving subject continuous shoot combined image is executed (step S15). The generated moving subject continuous shoot combined image is stored in the memory 201. The combining process at step S15 will be described in detail hereinafter.

The moving subject continuous shoot combined image data stored in the memory 201 is displayed by the video output section 202 on the liquid crystal display section 301 as the moving subject continuous shoot combined image (step S16). Then, the moving subject continuous shoot combined image data stored in the memory 201 is stored in the external memory 304 (step S17), and the first continuous shooting and combining process is finished. In step S17, for example, the moving subject continuous shoot combined image data is encoded and compressed into the JPEG code by the image processing section 203, and stored in the external memory 304 as a JPEG file. The stored moving subject continuous shoot combined image data (or the stored JPEG file) may be output to the external apparatus through the external interface 303.

The first continuous shooting process at step S13 will be explained in detail with reference to FIG. 8. Firstly, the continuous shooting speed of the image data generating section 21 is set to the continuous shooting speed F1 stored in the memory 21 (step S21). Then, a first frame is photographed at the continuous shooting speed of F1 by the image data generating section 21 according to various condition setting information stored in the memory 201, and the photographed image data corresponding to the photographed first frame is generated to be stored in the memory 201 (step S22). The photographed image data is assumed to be stored in the memory 201 corresponding to a continuous shooting speed at a time of photographing and to an order of the photographed image data from the beginning of the photographing. The same assumption will be applied in the following.

Serial numbers of each of the pieces of the photographed image data stored in the memory 201 is referred to and whether C1 frames have been photographed in step S22 or not is judged (step S23). If C1 frames have not been photographed yet (step S22; No), the process is shifted to step S22. If C1 frames have been photographed (step S22; Yes), the maximum burst C2 for continuous shooting is set as C2=(C1−1)/2 (step S24).

The continuous shooting speed in the image data is set to be a half of the continuous shooting speed as it is (step S25). Then, the next one frame is photographed at the continuous shooting speed as it is set by the image data generating section 21 according to various condition setting information stored in the memory 201, and the photographed image data corresponding to the photographed frame is generated to be stored in the memory 201 (step S26). Serial numbers of each of the pieces of the photographed image data stored in the memory 201 is referred to and whether C2 frames have been photographed in step S26 or not is judged (step S27). If C2 frames have not been photographed yet (step S27; No), the process is shifted to step S26.

If C2 frames have been photographed (step S27; Yes), serial numbers of each of the pieces of the photographed image data stored in the memory 201 is referred to and whether a total number of the photographed frames reached the maximum number N of images to be shot or not is judged (step S28). If the total number of the photographed frames reaches the maximum number N of images to be shot (step S28; Yes), the first continuous shooting process is finished.

If the total number of the photographed frames does not reach the maximum number N of images to be shot (step S28; No), whether the continuous shooting speed currently being set is smaller than a predetermined value or not is judged (step S29). If the currently set continuous shooting speed is smaller than the predetermined value (step S29; Yes), the first continuous shooting process is finished. If the currently set continuous shooting speed is equal to or more than the predetermined value (step S29; No), the process is shifted to step 25.

The combining process at step S15 will be explained in detail with reference to FIG. 9. Firstly, a quasi background image, which is a pseudo background image, is generated from all of the photographed image data (all of the frames) and a quasi background image generating process for calculating fluctuating threshold value used to extract subject area image from the quasi background image is executed (step S31). The quasi background image generating process at step S31 will be described in detail hereinafter. A subject area image extracting process for generating area mask data used to extract subject area image from all of the frames using the fluctuating threshold value calculated at step S31 is then executed (step S32). The subject area image extracting process at step S32 will be described in detail hereinafter.

Subject area images of all of the frames are extracted from the photographed image data stored in the memory 201 using the area mask data generated at step S32, and a frame (one photographed image data) including a temporally last subject area image is obtained (step S33). The continuous shooting speed corresponding to the last subject area image read in step S33 is obtained by referring to the memory 201 (step S34). Then, whether an overwriting with the subject area images to the frame including the last subject area image obtained in step S33 has finished or not is judged (step S35). In step S35, the overwriting is judged to be finished in a case that a frame including the subject area image to be overwritten is not obtained at step S36 described hereinafter.

If the overwriting has finished (step S35; Yes), the combining process is finished. If the overwriting has not finished (step S35; No), a frame just before, by a single frame in a continuous shooting speed obtained in step S34, a frame including the last subject area image is selected from all of the frames stored in the memory 201, and a subject area image of the selected frame is obtained (step S36).

The subject area image obtained at step S36 is overwritten on a part of the image where the subject area images are not overlapped within the frame including the last subject area image obtained at step S33 (step S37), and the process is shifted to step S35. If the subject area image is not obtained at step S36, the overwriting is not executed in step S37.

The quasi background image generating process at step S31 will be explained in detail with reference to FIG. 10. Each of coordinates (x, y) corresponding to pixels in the frame is initialized (step S41). The coordinate in the frame is selected such as, for example, a coordinate at an upper left is selected first, and pixel to be selected next is shifted to the right. When a coordinate at an upper right is selected, a coordinate at a left end in next lower line is selected. Then, pixel to be selected next is shifted to the right. By repeating the above process, all pixels in the frame are selected in order. In step S41 in this embodiment, the coordinate at an upper left is assigned to be an initial coordinate.

A non-selected frame is selected from all of the frames stored in the memory 201 and a pixel value of a coordinate (x, y) of a currently selected pixel in the currently selected frame is obtained (step S42). In step S43, whether pixel values of the same coordinate (x, y) in all of the frames are obtained or not is judged (step S43). If the pixel values of the same coordinate (x, y) in all of the frames are not obtained yet (step S43; No), the process is shifted to step S42.

If the pixel values of the same coordinate (x, y) in all of the frames are obtained (step S43; Yes), a middle value fb among the pixel values of the same coordinate (x, y) in all of the frames is obtained (step S44). The obtained middle value fb is assigned to be a pixel value in the quasi background image.

Then, standard deviations fs of all of the frames that are corresponding to the middle value fb obtained in step S44 are calculated (step S45). The standard deviation fs is calculated under the following formula (1).

[Formula]

$$fs(x, y) = \sqrt{\frac{\sum_{n=1}^{page} (fd(n, x, y)^2)}{page - 1}} \quad (1)$$

fd (n, x, y)=|fb (x, y)−f(n, x, y)|: difference value of pixel value of coordinate (x, Y) in frame n;

fb (x, Y): middle value (pixel value of quasi background image) of coordinate (x, y) in the frame;

f (n, X, y): pixel value of coordinate (x, y) in frame n;

n: frame number (1 to page);

page: total number of frames

Whether the calculation for calculating the standard deviation in step S45 is finished regarding all of the coordinates or not is judged (step S46). If the calculation as to all of the coordinates has not finished (step S46; No), next non-selected coordinate (x, y) in the frame is selected (shifted) (step S47), and the process is shifted to step S42.

If the calculation has finished as to all of the coordinates (step S46; Yes), a non-selected frame is selected from all of the frames and pixel values exceeding the standard deviation fs are extracted from pixel values of all of the coordinates in the selected frame (step S48). Then, whether a pixel value exceeding the standard deviation fs as to all of the frames (and all of the coordinates included therein) is extracted or not is judged (step S49). If the pixel value exceeding the standard deviation fs as to all of the frames and all of the coordinates included therein is not extracted (step S49; No), the process is shifted to step S48.

If the pixel value exceeding the standard deviation fs as to all of the frames and all of the coordinates included therein is extracted (step S49; Yes), the fluctuating threshold value$_{move}$ is calculated from the pixel values extracted in step S48 (step S50), and the quasi background image generating process is finished. The fluctuating threshold value$_{move}$ is calculated under the following formula (2).

[Formula]

$$move = \sqrt{\frac{\sum_{m=1}^{maxm} (over[m]^2)}{maxm - 1}} \quad (2)$$

over [m]=fd (n, x, y) {f s (x, y)<f d (n, x, y), 0<m≧maxm},
Maxm: f s (x, y)<f d (n, x, y)

A subject area extracting process at step S32 will be described in detail with reference to FIG. 11. Firstly, one of non-selected frames is selected from all of the frames (step s61), and non-selected one coordinate (x, y) is selected from the currently selected frame n (step S62). Then, whether a pixel difference value fd (n, X, Y) in the selected coordinate (x, y) in the selected frame n exceeds the fluctuating threshold value$_{move}$ or not is judged (step S63). If the pixel difference value fd (n, x, y) exceeds the fluctuating threshold value$_{move}$ (step S63; Yes), the coordinate (x, y) is judged to be valid and data fp (n, x, y) is set to be fp (n, x, y)=1 (step S64). If the pixel difference value fd (n, x, y) does not exceed the fluctuating threshold value$_{move}$ (step S63; No), the coordinate (x, y) is judged to be invalid and data fp (n, x, y) is set to be fp (n, x, y)=0 (step S65).

Then, whether all of the coordinates in the same frame n have selected or not is judged (step S66). If all of the coordinates in the same frame n have not selected yet (step S66; No), the process is shifted to step S62. If all of the coordinates in the same frame n have selected (step S66; Yes), a labeling for numbering, as to the generated data fp of 0 or 1, same number to continuous areas and different number to separated areas is performed, and only a maximum area among the labeled areas judged to be valid (remained) (step S67). Then, processes such as an expansion (step S68), a covering (step S69), or a contracting (step S70) for complementing deficits are executed. At this moment, more natural overwriting can be performed by adding permeation parameter to a peripheral of generated area information.

Then, area mask data of the area extracted in steps 67 to 70 is generated (step S71) and whether all of the frames are selected or not is judged (step S72). If all of the frames are not selected yet (step S72; No), the process is shifted to step S61. If all of the frames are selected (step S72; Yes), the subject area extracting process is finished.

As described above, according to the embodiment, the photographing apparatus 1 performs continuous shooting corresponding to a plurality of continuous shooting speed by slowing down the continuous shooting speed in stages. As a result, photographed image data of adequate continuous shooting speed can be obtained from all of the photographed image data corresponding to a moving subject of various speeds. Moreover, the continuous shooting can be performed in which moving speed of the moving subject and angle of view are less effective compared with the case in which the continuous shooting speed is constant.

Moreover, the photographing apparatus 1 repeats continuous shooting for generating C1 frames of photographed image data at continuous shooting speed F1, changing current continuous shooting speed to be halved, and performing continuous shooting for generating (C1−1)/2 frames of photographed image data. As a result, photographed image data of adequate continuous shooting speed can be certainly obtained from all of the photographed image data corresponding to a moving subject of various speeds.

Moreover, the photographing apparatus 1 obtains the continuous shooting speed which corresponds to the photographed image data including the last subject area image after the continuous shooting according to all of the photographed image data (all of the frames), selects photographed image data which corresponds to the obtained continuous shooting speed according to all of the photographed image data, and combines the selected photographed image data to generate the moving subject continuous shoot combined image data. As a result, the moving subject continuous shoot combined image data in which each of the moving subject is moderately dispersed can be generated corresponding to a moving subject of various speeds.

Moreover, the photographing apparatus 1 accepts an input operation to set the continuous shooting number C1 through the operating section 302 by the user, and performs continuous shooting by using the set continuous shooting number C1. As a result, the user can set an arbitrary value as the continuous shooting number C1.

Moreover, the photographing apparatus 1 starts the continuous shooting according to an input through the shutter key of the operating section 302 to be held down. Consequently, the user can start the continuous shooting at desired timing.

Moreover, the photographing apparatus 1 accepts an input operation to set the maximum number N of images to be shot through the operating section 302 by the user, and performs continuous shooting for generating the set maximum number N of images. As a result, workloads of the user during the continuous shooting can be reduced.

Moreover, the photographing apparatus 1 accepts an input operation to set the continuous shooting speed F1 as a continuous shooting speed at a time of starting the photographing through the operating section 302 by the user, and performs continuous shooting by using the set continuous shooting number C1. As a result, the user can set an arbitrary value as the continuous shooting speed at a time of starting the photographing.

[Modification]

Figure 13:
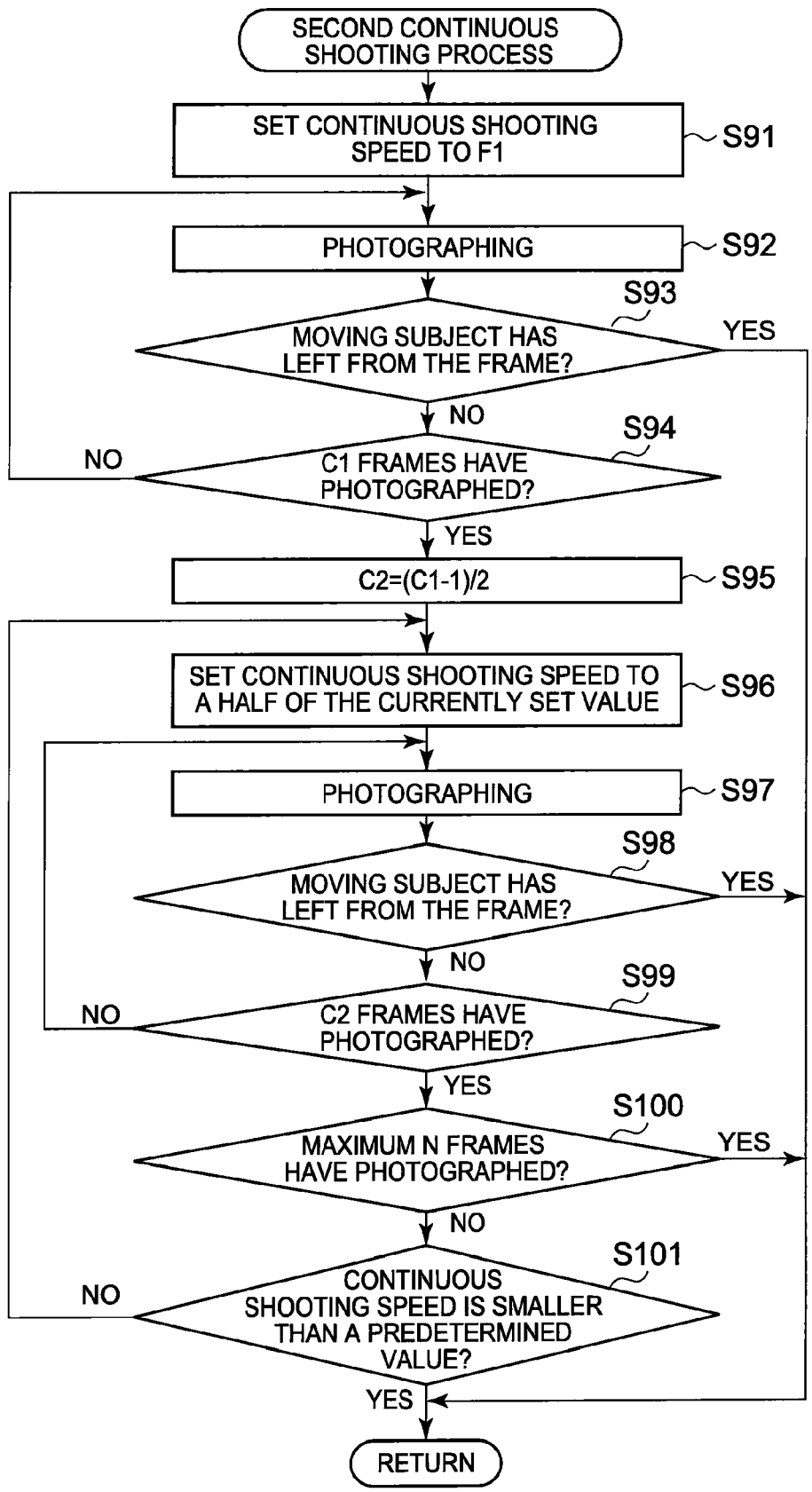
FIG. 13 is a flow-chart showing a second continuous shooting process in the second continuous shooting and combining process.
Figure 14:
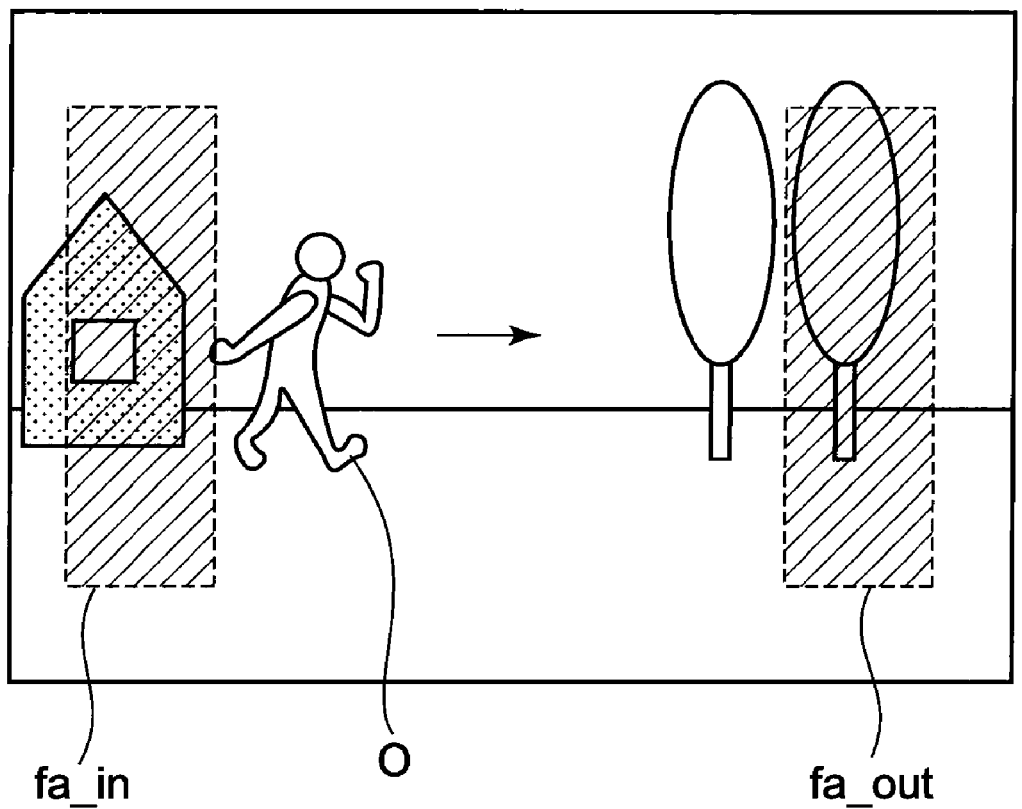
FIG. 14 is a diagram showing a start evaluating area and a finish evaluating area in a frame.
Figure 15A:
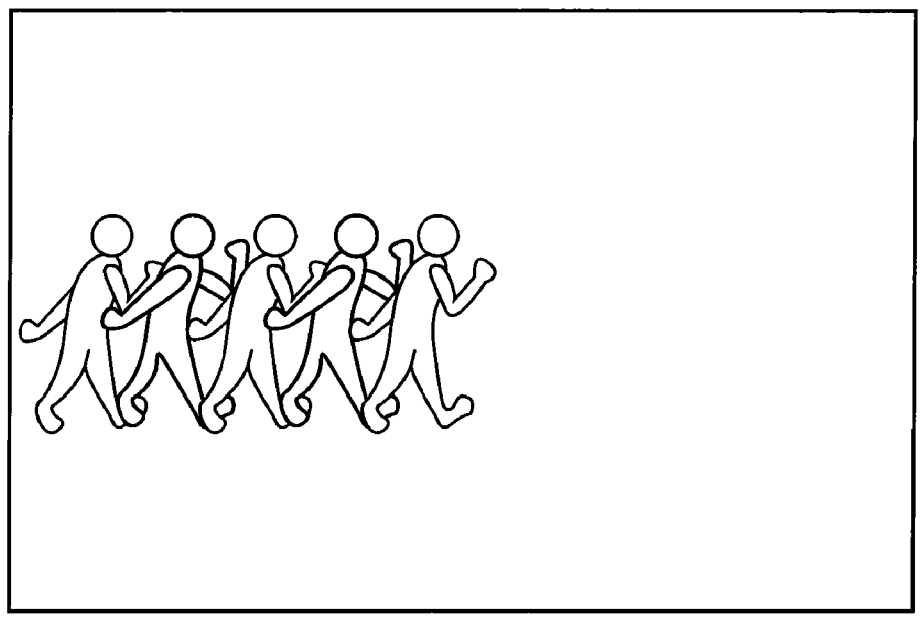
FIG. 15A is a diagram showing an example of moving subject continuous shoot combined image in a case that the continuous shooting speed is set to be larger corresponding to a passing speed of the moving subject.
Figure 15B:
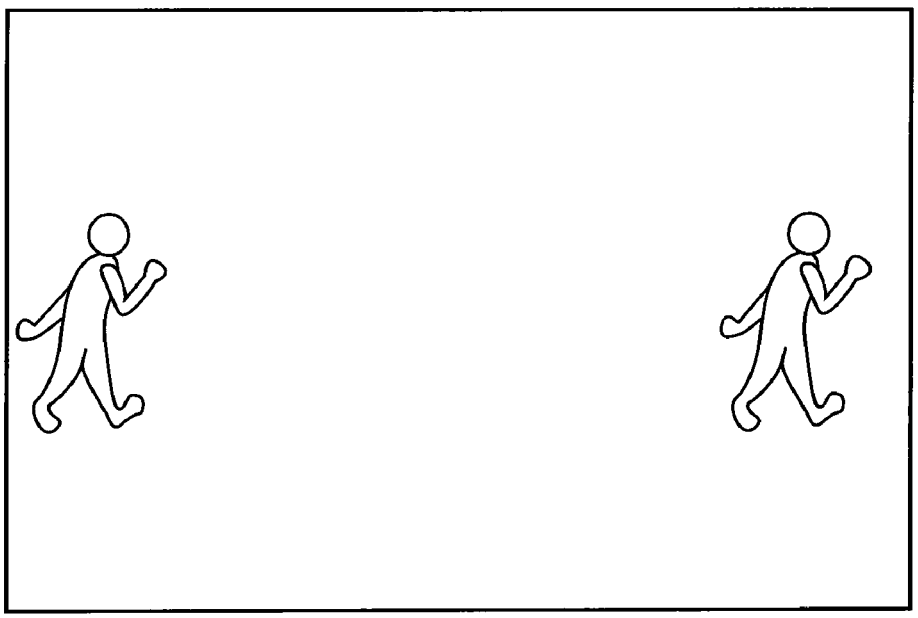
FIG. 15B is a diagram showing an example of moving subject continuous shoot combined image in a case that the continuous shooting speed is set to be smaller corresponding to a passing speed of the moving subject.
Figure 16:
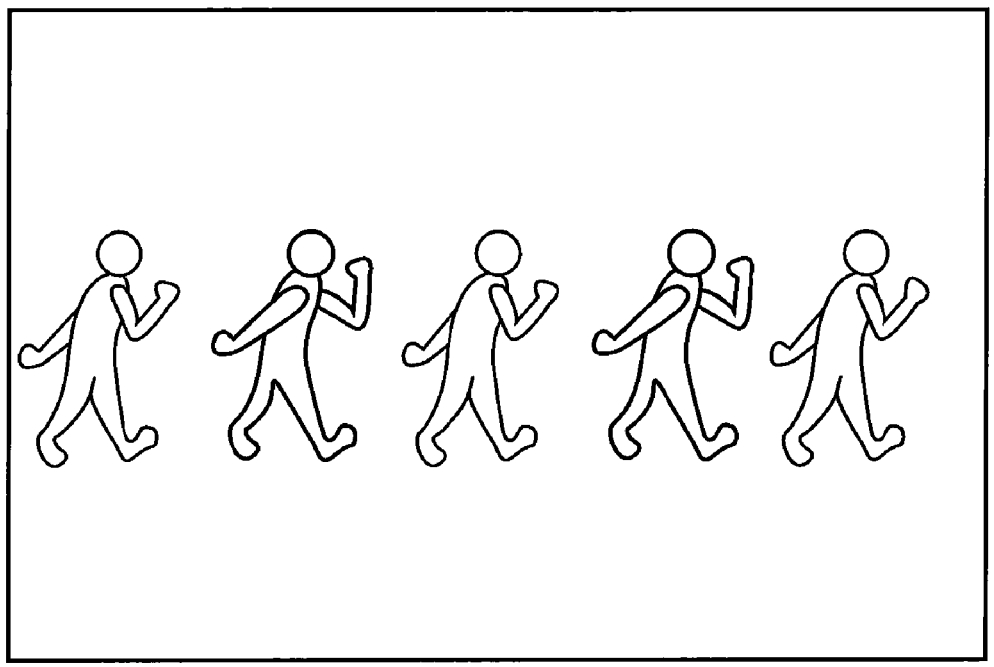
FIG. 16 is a diagram showing an ideal moving subject continuous shoot combined image.

A modified example of the above-described embodiment will be explained with reference to FIGS. 12 to 14. Although, the above embodiment describes the configuration in which the photographing apparatus 1 starts the continuous shooting when the shutter key is held down and automatically finishes the photographing when the number of photographed images reaches the maximum number N of images to be shot, a configuration in which the photographing apparatus 1 automatically starts the continuous shooting when the moving subject enters the frame and automatically finishes the photographing when the moving subject leaves from the frame will be explained in this modified example.

The photographing apparatus 1 is used as an apparatus in this modified example. However, it is assumed that a second continuous shooting combining program is stored in the program memory 201 in place of the first continuous shooting combining program.

Next, a performance of the photographing apparatus 1 according to the modified example will be described with reference to FIGS. 12 to 14. FIG. 12 shows a flow of a second continuous shooting and combining process. FIG. 13 shows a flow of a second continuous shooting process in the second continuous shooting and combining process. FIG. 14 shows a start evaluating area and a finish evaluating area in a frame.

In this modified example, a setting process and a second continuous shooting and combining process are executed at the photographing apparatus 1. The setting process is the same as that of the above-described embodiment. The second continuous shooting and combining process is a process for continuously shooting the moving subject with the continuous shooting speed slowed down in stages from the default value F1 according to a timing that the moving subject enters the frame and a timing that the moving subject leaves from the frame, selecting the photographed image data of C1 frames including the subject area image from all of the photographed image data at an adequate continuous shooting speed, and generating the moving subject continuous shoot combined image by combining the selected photographed image data.

In the photographing apparatus 1, for example, while the live view displaying is being performed, the controller 204 executes the second continuous shooting and combining process according to the second continuous shooting combining program stored in the program memory 205 when an execution instruction as a trigger of the second continuous shooting and combining process is input to the operating section 302 by the user.

Figure 12:
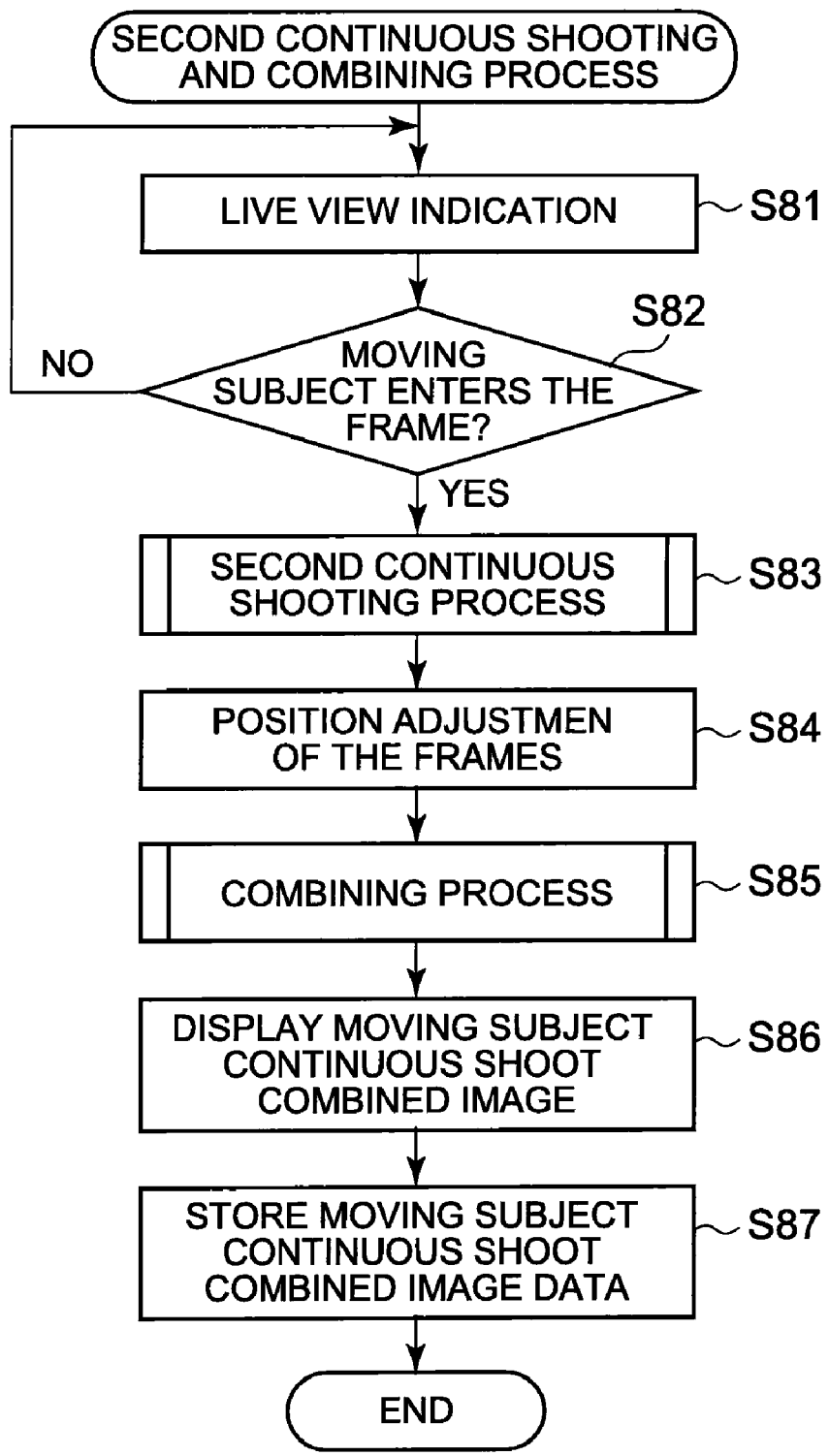
FIG. 12 is a flow-chart showing a second continuous shooting and combining process.

As shown in FIG. 12, live view image data generated by the image data generating section 21 is, firstly, displayed by the video output section 202 on the liquid crystal display section 301 as a live view image (step S81). In step S81, it is assumed that live view image data of latest two frames is stored in the memory 201. A frame number of the live view image data of the latest two frames will be represented as "k" and a frame number of live view image data of a frame adjacent to the latest two frames will be represented as "k−1".

Then, the live view data of the latest two frames stored in the memory 201 is referred to and whether a start evaluating area is not fa_in (k−1)≈fa_in (k), that is the moving subject enters the frame or not is judged (step S82). The start evaluating area fa_in is an area within the angle of view for detecting a passage of the moving subject to be photographed when entering the frame. For example, as shown in FIG. 14, if the moving subject O enters the frame from far left and moves to right in the angle of view, the start evaluating area is set near the left end of the angle of view.

If the moving subject has not entered the frame (step S82; No), the process is shifted to step S81. If the moving subject has entered the frame (step S82; Yes), the second continuous shooting process is executed (step S83). The second continuous shooting process will be described in detail hereinafter. Steps S84 to S87 are the same as steps S14 to S17 of the first continuous shooting and combining process.

The second continuous shooting process will be described with reference to FIG. 13. Steps S91 and S92 are the same as steps S21 and S22 in the first continuous shooting process, respectively. The photographed image data of the latest two frames stored in the memory 201 is referred to (a frame number of the photographed image data will be represented as "k" and a frame number of the photographed image data of a frame adjacent to the latest two frames will be represented as "k−1") and whether a start evaluating area is not fa_out (k−1)≈fa_out (k), that is the moving subject leaves from the frame or not is judged (step S93). The finish evaluating area fa_out is an area within the angle of view for detecting a passage of the moving subject to be photographed when leaving from the frame. For example, as shown in FIG. 14, if the moving subject O enters the frame from far left and moves to right in the angle of view, the finish evaluating area is set near the right end of the angle of view.

If the moving subject has left from the frame (step S93; Yes), the second continuous shooting process is finished. If the moving subject has not left from the frame (step S93; No), the process is shifted to step S94. Steps S94 to S97 are the same as steps S23 to S26 in the first continuous shooting process, respectively. The photographed image data of the latest two frames stored in the memory 201 is referred to and whether the finish evaluating area is not fa_out (k−1)≈fa_out (k), that is the moving subject leaves from the frame or not is judged (step S98).

If the moving subject has left from the frame (step S98; Yes), the second continuous shooting process is finished. If the moving subject has not left from the frame (step S98; No), the process is shifted to step S99. Steps S99 to 5101 are the same as steps S27 to S29 in the first continuous shooting process, respectively.

As described above, according to the modified example, photographed image data of adequate continuous shooting speed can be obtained from all of the photographed image data corresponding to a moving subject of various speeds, and the moving subject continuous shoot combined image data can be generated from the obtained photographed image data as well as the above-described embodiment. Moreover, the photographing apparatus 1 judges whether the moving subject is detected in the photographed image (whether the moving subject enters the frame) or not according to the start evaluating area fa_in of the image data for performing the live view, and starts the continuous shooting when the moving subject enters the frame. As a result, continuous shooting can certainly be started to the moving subject that enters the frame and workloads of the user when starting the continuous shooting can be reduced.

Moreover, the photographing apparatus 1 judges whether the moving subject becomes not to be detected in the photographed image (whether the moving subject has left from the frame) or not according to the finish evaluating area fa_out of the image data, and finishes the continuous shooting when the moving subject has left from the frame. As a result, workloads of the user when finishing the continuous shooting can be reduced, and photographed image data that are not necessary can be prevented from being generated. Consequently, storage area of the memory 201 to store the photographed image data can be saved.

The description in the above embodiment is an example of the photographing apparatus, the photographing method and the program according to the present invention, which are not limited to the description.

For example, the above-described embodiment and the modified example thereof may be combined with each other arbitrarily. For example, the photographing apparatus 1 may be configured such that, the continuous shooting is started when the shutter key is held down and automatically finished when the moving subject has left from the frame or such that, the continuous shooting is started when the shutter key is held down or when the moving subject enters the frame.

Moreover, the photographing apparatus 1 may be configured such that, the continuous shooting is executed from the time when the shutter key starts to be held down to the time when the shutter key finishes to be held down. Moreover, in the above modified example, a photographed image data of a frame preceding the frame including the final photographed image data by a predetermined number of frames (for example, two frames) may be applied as finally photographed image data.

Moreover, in the above explanation, although an example wherein the program memory 201 is applied as the computer readable medium storing program therein according to the present invention is described, the scope of the present invention is not limited to the disclosed example.

A portable storage medium such as a CD-ROM or the like may be applied as the other computer readable medium.

Moreover, carrier wave may be applied as a medium providing program data according to the present invention through a communication line.

Regarding the detailed configuration and detailed performance of the photographing apparatus 1 according to the above disclosed embodiment and modified example thereof, it goes without saying that arbitrary modification can be applied within the scope of the present invention.

The entire disclosure of Japanese Patent Application No. 2009-002220 filed on Jan. 8, 2009 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A photographing apparatus comprising:
   a photographing section for generating photographed image data by performing continuous shooting; and
   a controller for causing the photographing section to perform the continuous shooting with a continuous shooting speed thereof being slowed down in stages to correspond to a plurality of different continuous shooting speeds;
   wherein the controller causes the photographing section to repeat:
   performing the continuous shooting by a first continuous shooting number at a first continuous shooting speed,
   shifting a current continuous shooting speed to be halved, and
   performing continuous shooting to generate photographed image data of the number of (the first continuous shooting number minus 1)/2 frames.

2. The photographing apparatus of claim 1, wherein the controller:
   obtains a continuous shooting speed of a moving subject according to the photographed image data generated by the photographing section,
   selects image data, which corresponds to the obtained continuous shooting speed, from the photographed image data, and
   combines the selected image data to generate moving subject continuous shoot combining image data.

3. The photographing apparatus of claim 1, further comprising:
   a setting section for setting the first continuous shooting number,
   wherein the controller causes the photographing section to perform the continuous shooting by using the first continuous shooting number set by the first setting section.

4. The photographing apparatus of claim 1, further comprising:
   a setting section for setting the first continuous shooting speed,
   wherein the controller causes the photographing section to perform the continuous shooting at the continuous shooting speed set by the setting section when starting the continuous shooting.

5. A photographing apparatus comprising:
   a photographing section for generating photographed image data by performing continuous shooting;
   a controller for causing the photographing section to perform the continuous shooting with a continuous shooting speed thereof being slowed down in stages to correspond to a plurality of different continuous shooting speeds; and a setting section for setting a maximum number of images to be shot, wherein the controller causes the photographing section to perform the continuous shooting to generate the set maximum number of images.

6. The photographing apparatus of claim 5, wherein the controller judges whether a moving subject is detected in the photographed image according to an evaluating area for judging entering of the moving subject to a frame in the photographed image data generated by the photographing section, and causes the photographing section to start the continuous shooting when the moving subject is detected.

7. The photographing apparatus of claim 5, wherein the controller judges whether a moving subject is no longer detected in the photographed image according to an evaluating area for judging leaving of the moving subject from a frame in the photographed image data generated by the photographing section, and causes the photographing section to finish the continuous shooting when the moving subject is no longer detected.

8. The photographing apparatus of claim 5, further comprising:

an instruction section for providing an instruction to start the continuous shooting, wherein the controller causes the photographing section to start the continuous shooting according to the instruction by the instruction section.

9. A photographing method of a photographing apparatus, the method comprising:

generating photographed image data by performing continuous shooting by a photographing section; and causing, by a controller, the photographing section to perform the continuous shooting with a continuous shooting speed thereof being slowed down in stages to correspond to a plurality of different continuous shooting speeds, wherein the controller causes the photographing section to repeat:

performing the continuous shooting by a first continuous shooting number at a first continuous shooting speed, shifting a current continuous shooting speed to be halved, and performing continuous shooting to generate photographed image data of the number of (the first continuous shooting number minus 1)/2 frames.

10. A photographing method of a photographing apparatus, the method comprising:

generating photographed image data by performing continuous shooting by a photographing section;

causing, by a controller, the photographing section to perform the continuous shooting with a continuous shooting speed thereof being slowed down in stages to correspond to a plurality of different continuous shooting speeds; and setting, by a setting section, a maximum number of images to be shot;

wherein the controller causes the photographing section to perform the continuous shooting to generate the set maximum number of images.

11. A non-transitory computer readable storage medium having a program stored thereon for controlling a computer to function as:

a photographing section for generating photographed image data by performing continuous shooting; and a controller for causing the photographing section to perform the continuous shooting with a continuous shooting speed thereof being slowed down in stages to correspond to a plurality of different continuous shooting speeds;

wherein the controller causes the photographing section to repeat:

performing the continuous shooting by a first continuous shooting number at a first continuous shooting speed, shifting a current continuous shooting speed to be halved, and performing continuous shooting to generate photographed image data of the number of (the first continuous shooting number minus 1)/2 frames.

12. A non-transitory computer readable storage medium having a program stored thereon for controlling a computer to function as:

a photographing section for generating photographed image data by performing continuous shooting;

a controller for causing the photographing section to perform the continuous shooting with a continuous shooting speed thereof being slowed down in stages to correspond to a plurality of different continuous shooting speeds; and a setting section for setting a maximum number of images to be shot, wherein the controller causes the photographing section to perform the continuous shooting to generate the set maximum number of images.

* * * * *